(12) United States Patent
Marx et al.

(10) Patent No.: US 6,948,760 B2
(45) Date of Patent: Sep. 27, 2005

(54) COVER ASSEMBLY FOR A VEHICLE BED AND METHOD FOR MOUNTING THE SAME

(75) Inventors: Craig T. Marx, Washington Township, MI (US); Thomas J. Apfel, II, Washington Township, MI (US); Nicanor P. Cantu, III, Rochester, MI (US); Thomas J. Mack, Highland, MI (US)

(73) Assignee: Webasto Sunroofs, Inc., Rochester Hill, MI (US)

( * ) Notice: Subject to any disclaimer, the term of this patent is extended or adjusted under 35 U.S.C. 154(b) by 0 days.

(21) Appl. No.: 10/445,866

(22) Filed: May 28, 2003

(65) Prior Publication Data

US 2004/0239143 A1 Dec. 2, 2004

(51) Int. Cl.7 .................................................. B60P 7/04
(52) U.S. Cl. ............................. 296/100.12; 296/100.18; 296/136.12
(58) Field of Search ........................ 296/100.01, 100.11, 296/100.12, 100.16, 100.17, 100.18, 136.01, 136.03, 136.1, 136.12, 136.13, 37.6; 160/32, 35, 36, 37, 206, 209

(56) References Cited

U.S. PATENT DOCUMENTS

| | | | | |
|---|---|---|---|---|
| 2,213,601 A | * | 9/1940 | White | 296/98 |
| 2,248,538 A | * | 7/1941 | Liebler | 296/98 |
| 3,923,334 A | | 12/1975 | Key | |
| 4,210,361 A | | 7/1980 | Marvin et al. | |
| 4,273,377 A | | 6/1981 | Alexander | |
| 4,285,539 A | | 8/1981 | Cole | |
| 4,289,346 A | | 9/1981 | Bourgeois | |
| 4,547,014 A | | 10/1985 | Wicker | |
| 4,563,034 A | | 1/1986 | Lamb | |
| 4,611,848 A | | 9/1986 | Romano | |
| 4,786,099 A | * | 11/1988 | Mount | 296/98 |
| 4,792,178 A | * | 12/1988 | Kokx | 296/98 |
| 4,795,206 A | * | 1/1989 | Adams | 296/98 |
| 4,807,921 A | * | 2/1989 | Champie et al. | 296/98 |
| 4,932,704 A | * | 6/1990 | Ament | 296/37.16 |
| 5,040,843 A | * | 8/1991 | Russell et al. | 296/98 |
| 5,174,625 A | | 12/1992 | Gothier et al. | |
| 5,251,950 A | * | 10/1993 | Bernardo | 296/98 |
| 5,427,428 A | | 6/1995 | Ericson et al. | |
| 5,531,497 A | * | 7/1996 | Cheng | 296/100.01 |
| 5,538,306 A | * | 7/1996 | Ament | 296/37.1 |
| 5,540,475 A | | 7/1996 | Kersting et al. | |
| 5,542,733 A | | 8/1996 | Kintz | |
| 5,971,469 A | * | 10/1999 | Lund et al. | 296/100.01 |
| 6,024,402 A | * | 2/2000 | Wheatley | 296/100.18 |

(Continued)

FOREIGN PATENT DOCUMENTS

| | | | | |
|---|---|---|---|---|
| EP | 379821 | * | 8/1990 | 296/100.12 |
| EP | 459879 | * | 12/1991 | 296/100.12 |
| GB | 2229404 | * | 9/1990 | 296/100.12 |
| JP | 353023138 | * | 3/1978 | 160/206 |
| JP | 402034446 | * | 2/1990 | 296/37.16 |

*Primary Examiner*—H. Gutman
(74) *Attorney, Agent, or Firm*—Pillsbury Winthrop Shaw Pittman LLP

(57) ABSTRACT

A cover assembly for a vehicle bed includes a first pair of track members mountable to side walls of the bed. A cover unit includes a second pair of track members and a plurality of support members movably mounted on the second pair of track members. A cover is mounted to the support members. The cover unit is to be removably mounted in an operative position to the bed with the second pair of track members aligned with the first pair of track members so that the support members can move along the first and second pairs of track members to extend and retract the cover. At least one motor is connected to the support members for selectively moving them. At least one fastener secures the cover unit in the operative position and is releasable to allow the cover unit to be removed from the bed.

34 Claims, 22 Drawing Sheets

U.S. PATENT DOCUMENTS

| | | | |
|---|---|---|---|
| 6,076,881 A | * | 6/2000 | Tucker .................. 296/100.07 |
| 6,321,819 B1 | | 11/2001 | Copp et al. |
| 6,340,194 B1 | * | 1/2002 | Muirhead et al. ...... 296/100.06 |
| 6,422,635 B1 | | 7/2002 | Steffens et al. |
| 6,427,500 B1 | | 8/2002 | Weinerman et al. |
| 6,439,640 B1 | * | 8/2002 | Wheatley ............... 296/100.18 |
| 6,568,732 B2 | * | 5/2003 | De Gaillard ............. 296/24.43 |
| 2001/0035664 A1 | | 11/2001 | Steffens et al. |
| 2002/0113456 A1 | | 8/2002 | Schall et al. |
| 2003/0062736 A1 | * | 4/2003 | Ulert et al. ................ 296/24.1 |
| 2003/0197394 A1 | * | 10/2003 | Dimmer ................ 296/100.16 |

* cited by examiner

COVER ASSEMBLY FOR A VEHICLE BED AND METHOD FOR MOUNTING THE SAME

FIELD OF THE INVENTION

The present invention relates to a cover assembly for a vehicle bed.

BACKGROUND OF THE INVENTION

Cover assemblies for vehicle beds are well known in the art. Examples of cover assemblies are show in U.S. Pat. Nos. 4,563,034, 4,289,346, and 4,285,539.

The present invention provides improvements over known cover assemblies to facilitate mounting and removal of the cover assembly from the vehicle bed.

SUMMARY OF THE INVENTION

One aspect of the invention relates to a method for mounting a cover assembly to a vehicle bed. This aspect of the invention provides a method for mounting a cover assembly to a vehicle bed having at least opposing first and second side walls and a floor, the side walls and the floor defining an interior space having an upwardly facing opening. The method comprises mounting a first pair of elongated track members to respective first and second side walls and providing a removable cover unit. The cover unit comprises a second pair of elongated track members and a plurality of transverse support members. Each of the plurality of support members has first and second end portions. The first end portions are movably mounted on one of the second pair of track members and the second end portions are movably mounted on the other of the second pair of track members. A flexible cover is mounted to the plurality of transverse support members. The cover unit includes at least one releasable fastener and at least one motor operatively connected to the support members. The method comprises removably mounting the cover unit in an operative position to the vehicle bed such that the second pair of track members are aligned with the first pair of track members so that the support members can be selectively moved along the first and second pairs of track members by the at least one motor to extend and retract the flexible cover for opening and closing the vehicle bed. The at least one releasable fastener secures the cover unit in the operative position and is releasable to allow the cover unit to be removed from the vehicle bed.

Another aspect of the invention relates to a cover assembly for a vehicle bed that includes a removable cover unit. This aspect of the invention provides a cover assembly for a vehicle bed having at least opposing first and second side walls and a floor, the side walls and the floor defining an interior space having an upwardly facing opening. The cover assembly comprises a first pair of elongated track members mountable to respective first and second side walls and a removable cover unit. The cover unit comprises a second pair of elongated track members and a plurality of transverse support members. Each of the plurality of support members has first and second end portions. The first end portions are movably mounted on one of the second pair of track members and the second end portions are movably mounted on the other of the second pair of track members. A flexible cover is mounted to the plurality of transverse support members. The cover unit is constructed to be removably mounted in an operative position to the vehicle bed with the second pair of track members being aligned with the first pair of track members so that the support members can move along the first and second pairs of track members to extend and retract the flexible cover for opening and closing the vehicle bed. At least one motor is operatively connected to the support members for selectively moving the support members along the first and second pairs of track members to extend and retract the flexible cover. At least one releasable fastener is constructed to secure the cover unit in the operative position and to be releasable to allow the cover unit to be removed from the vehicle bed.

Yet another aspect of the invention relates to a removable cover unit that is removably mountable to a vehicle bed. This aspect of the invention provides a removable cover unit for removable installation in an operative position to a vehicle bed including at least opposing first and second side walls having a first pair of elongated track members mounted thereto and a floor, the side walls and the floor defining an interior space having an upwardly facing opening. The cover unit comprises a second pair of elongated track members and a plurality of transverse support members. Each of the plurality of support members has first and second end portions. The first end portions are movably mounted on one of the second pair of track members and the second end portions are movably mounted on the other of the second pair of track members. A flexible cover is mounted to the plurality of transverse support members. The cover unit is constructed to be removably mounted in an operative position to the vehicle bed with the second pair of track members being aligned with the first pair of track members so that the support members can move along the first and second pairs of track members to extend and retract the flexible cover for opening and closing the vehicle bed. At least one motor is operatively connected to the support members for selectively moving the support members along the first and second pairs of track members to extend and retract the flexible cover. At least one releasable fastener is constructed to secure the cover unit in the operative position and to be releasable to allow the cover unit to be removed from the vehicle bed.

Other aspects, features, and advantages of this invention will become apparent from the following detailed description when taken in conjunction with the accompanying drawings, which are part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
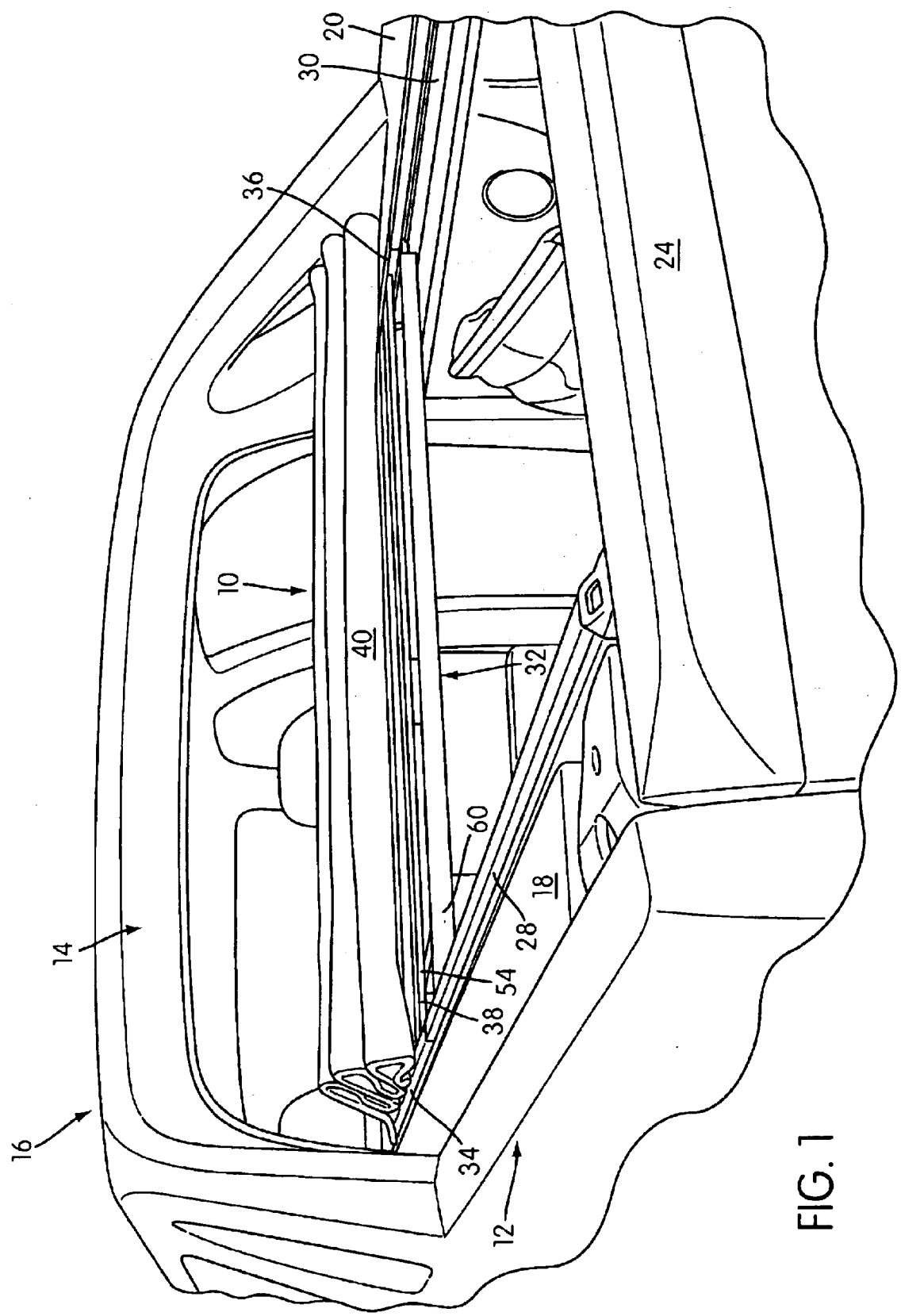
FIG. 1 is a left rear perspective view illustrating a cover assembly constructed in accordance with an embodiment of the invention having a cover unit removably installed to a vehicle bed, the cover unit including a flexible cover in an open position.

FIGS. 1–12 show a cover assembly 10 for a vehicle bed 12 constructed according to an embodiment of the present invention. The vehicle bed 12 extends rearwardly of a vehicle cab 14 of a vehicle 16. As is conventional, the vehicle cab 14 is designed to accommodate passengers, including a driver, and has various controls for operating the vehicle 16. As shown in FIGS. 1–5, the vehicle 16 is a pickup truck with the vehicle bed 12, or truck bed, having at least opposing first and second side walls 18, 20 and a floor 22. The side walls 18, 20 and floor 22 define an interior space having an upwardly facing opening. As shown in FIGS. 1–5, the vehicle bed 12 has a rear end wall 24. The rear end wall 24 may be a pivotably mounted tailgate for facilitating loading and unloading of the vehicle bed 12, or it may be fixedly secured in position. In the illustrated embodiment, the vehicle bed 12 includes a pivotally mounted front end wall 26 that provides a rear wall of the vehicle cab 14. The front end wall 26 may be moved to an open position, as shown in FIGS. 1–5, to provide additional space for the interior space of the vehicle bed 12. The front end wall 26 may be moved to a closed position to separate the vehicle cab 14 from the vehicle bed 12. Alternatively, the front end wall 26 may be rigidly mounted in the closed position or may not be provided at all.

The illustrated vehicle containing this movable front end wall 26 is the 2002 CHEVY AVALANCHE. However, the present invention may be practiced with any type of vehicle having a vehicle bed.

Figure 2:
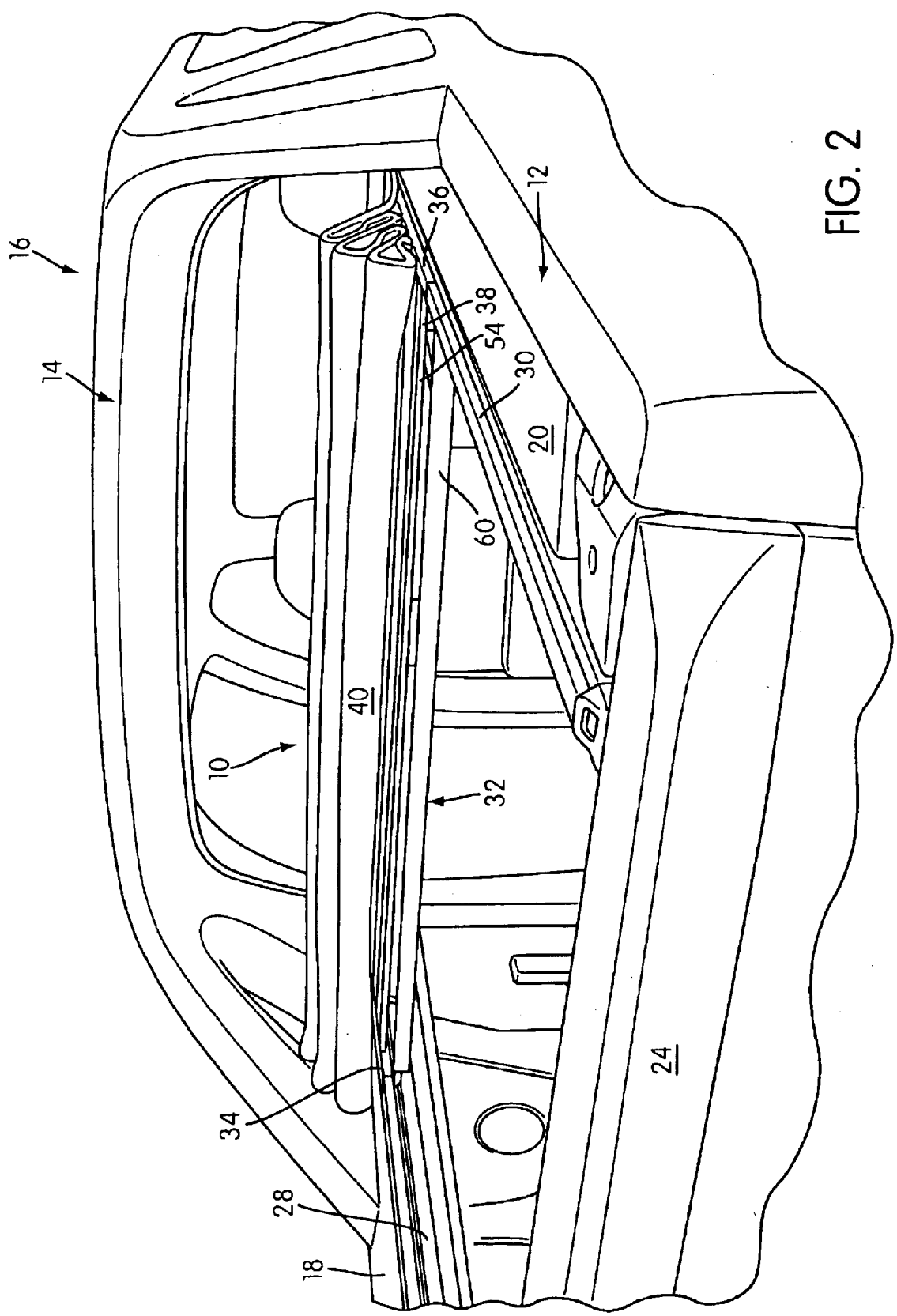
FIG. 2 is a right rear perspective view of the cover assembly shown in FIG. 1.
Figure 3:
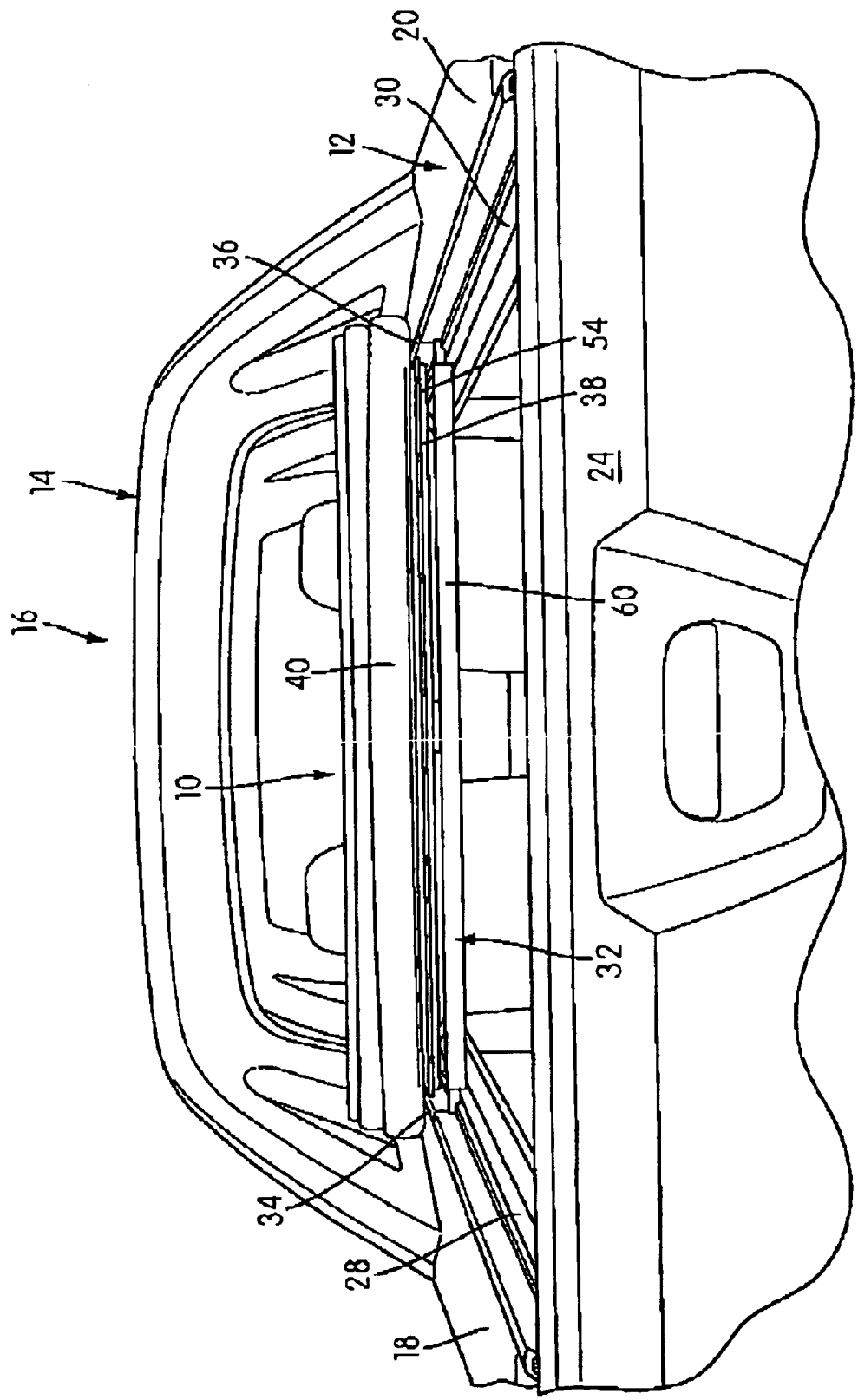
FIG. 3 is a rear perspective view of the cover assembly shown in FIG. 1.
Figure 4:
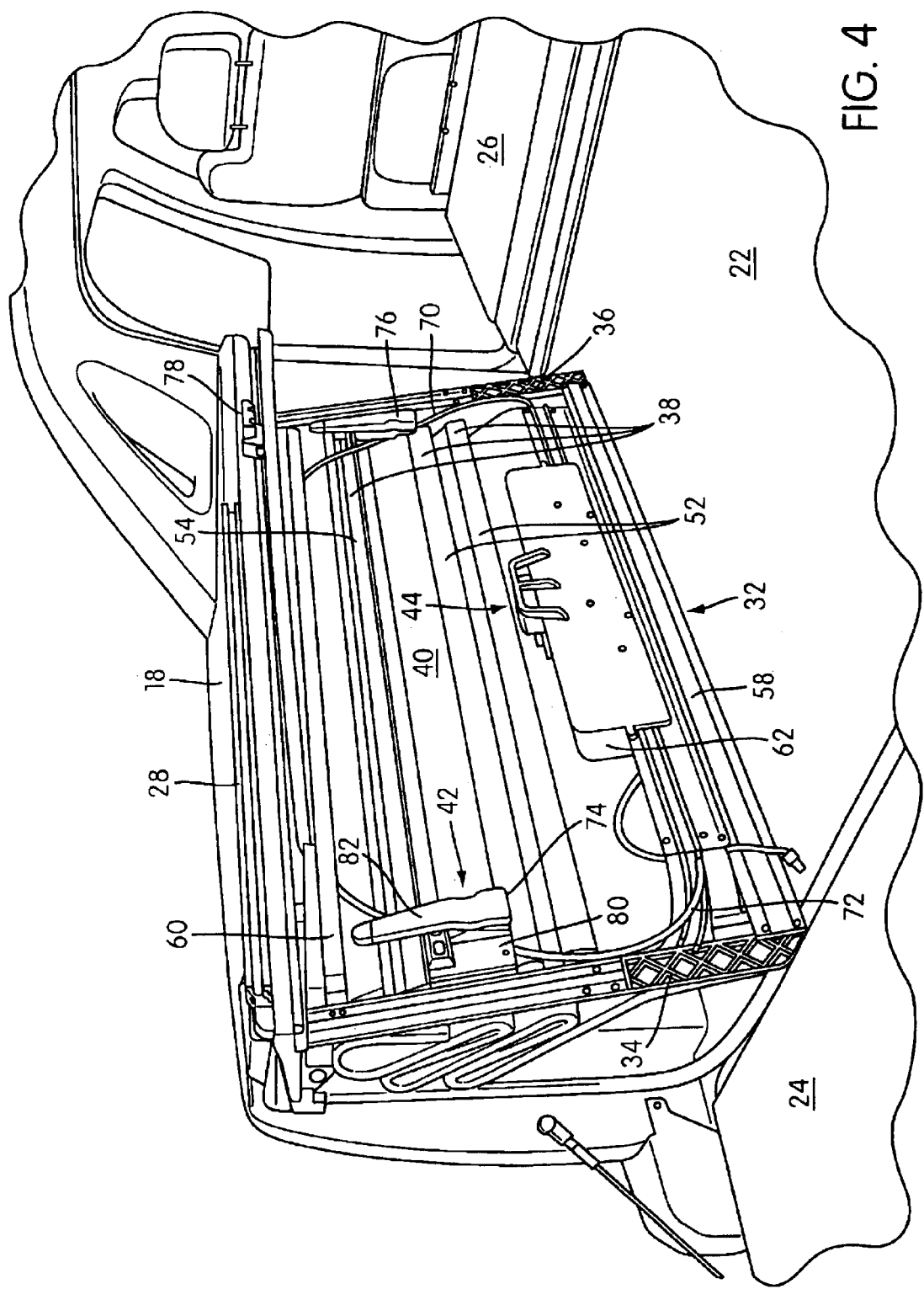
FIG. 4 is a bottom perspective view illustrating the cover unit of the cover assembly shown in FIG. 1 removed from the vehicle bed.
Figure 5:
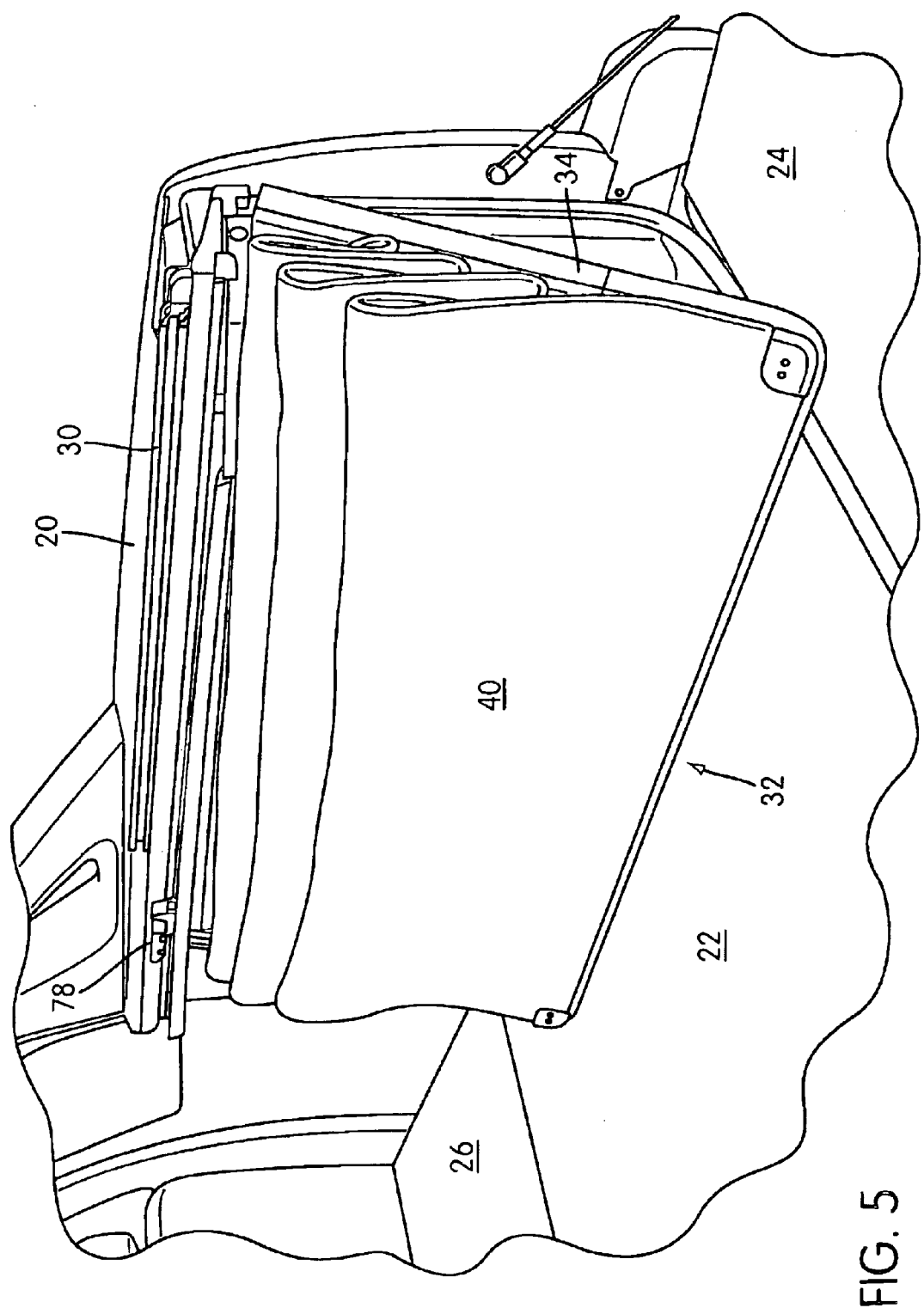
FIG. 5 is a top perspective view illustrating the cover unit of the cover assembly shown in FIG. 1 removed from the vehicle bed.

As shown in FIGS. 1–3, the cover assembly 10 includes a first pair of elongated track members 28, 30 mountable to respective first and second side walls 18, 20 and a removable cover unit 32 constructed to be removably installed in an operative position to the vehicle bed 12. FIGS. 4 and 5 illustrate the cover unit 32 removed in its assembled condition from the vehicle bed 12. The cover unit 32 may be removed from the vehicle bed 12 for storage purposes and for maximizing the cargo space within the vehicle bed 12.

Figure 6:
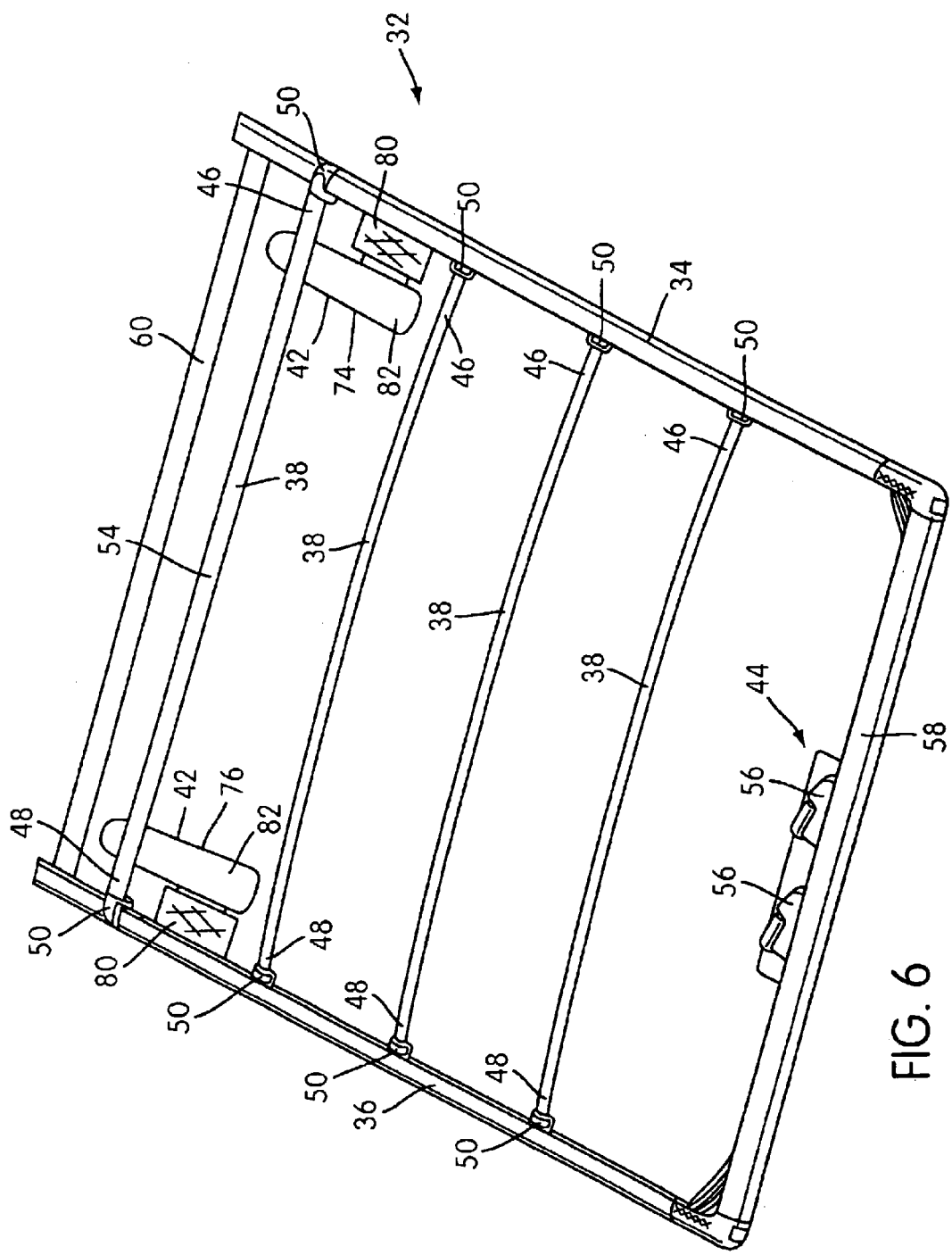
FIG. 6 is a schematic top view of the cover unit with the flexible cover removed therefrom.

As shown in FIGS. 4–6, the cover unit 32 includes a second pair of elongated track members 34, 36, a plurality of transverse support members 38, a flexible cover 40, at least one releasable fastener 42 constructed to removably mount the cover unit 32 in its operative position to the vehicle bed 12, and at least one motor 44.

As shown in FIG. 6, each of the plurality of support members 38 has first and second end portions 46, 48. The first end portions 46 are movably mounted on one of the second pair of track members 34 and the second end portions 48 are movably mounted on the other of the second pair of track members 36. The end portions 46, 48 of each of the support members 38 may include sliding members 50 secured thereto with the sliding members 50 being slidably mounted on respective ones of the second pair of track members 34, 36. Examples of sliding members slidably mounted on respective track members are disclosed in U.S. patent application Ser. No. 10/058,211 to Schall et al., the entirety of which is herein incorporated by reference. However, the end portions 46, 48 of the support members 38 may be mounted to respective track members 34, 36 by any other suitable method, such that each of the support members 38 may be moveable in opposing directions along the second pair of track members 34, 36.

The flexible cover 40 is mounted to the plurality of transverse support members 38. The cover 40 is preferably constructed of fabric, vinyl, or any other suitable material. The cover 40 may be mounted to the transverse support members 38 by any suitable method, such as by fasteners, gluing, and vibration welding, for example. As shown in FIG. 4, the cover 40 may include a plurality of loops 52 that respective support members 38 may pass therethrough, for example.

The cover unit 32 is constructed to be removably mounted in an operative position to the vehicle bed 12 with the second pair of track members 34, 36 being aligned with the first pair of track members 28, 30 so that the support members 38 can move along the first and second pairs of track members 28, 30, 34, 36 to extend and retract the flexible cover 40 for opening and closing the vehicle bed 12, as shown in FIGS. 1–3. The at least one releasable fastener 42 is constructed to releasably secure the cover unit 32 in its operative position. Also, as shown in FIGS. 4–5, the at least one releasable fastener 42 is releasable to allow the cover unit 32 to be removed from the vehicle bed, as will be further discussed.

The at least one motor 44 is operatively connected to the support members 38 for selectively moving the support members 38 along the first and second pairs of track members 28, 30, 34, 36 to extend and retract the flexible cover 40.

Specifically, the plurality of support members 38 includes a distal support member 54 that is positioned the most distant from the front end wall 26 with respect to the remaining plurality of support members 38. The support members 38 including the distal support member 54 are movably arranged on the first and second pairs of track members 28, 30, 34, 36 such that movement of the distal support member 54 in the opening direction towards the front end wall 26 causes the distal support member 54 to push each of the support members 38 in a sequential manner in the opening direction and hence sequentially collapses the cover 40 secured thereto, thereby facilitating access to the interior space of the vehicle bed 12. Movement of the distal support member 54 along the first and second pairs of track members 28, 30, 34, 36 in the closing direction towards the rear end wall 24 causes the distal support member 54 to pull the other support members 38 in a sequential manner in the closing direction and hence sequentially moves the cover 40 secured thereto into covering relation to the interior space of the vehicle bed 12. In its fully closed position, the cover assembly 10 limits access from the top to the interior space of the vehicle bed 12. The distal support member 54 may also move to any one of a plurality of intermediate open positions, thereby permitting access to a portion of the interior space of the vehicle bed 12 and preventing access to another portion of the interior space of the vehicle bed 12. Further details of the movement of the distal support member 54 to push and pull the remaining support members 38 in opening and closing directions are disclosed in the incorporated U.S. Patent Application to Schall et al.

In the fully open position, the support members 38 including the distal support member 54 are all arranged on the second pair of track members 34, 36 (see FIGS. 1–3) to facilitate removal of the cover unit 32 from the vehicle bed 12 as a unit, as will be further discussed.

The at least one motor 44 is operatively connected to the distal support member 54. The at least one motor 44 is activated to selectively move the distal support member 54 in the opening and closing directions.

In the illustrated embodiment, the at least one motor 44 includes a pair of reversible motor units 56 (see FIG. 6). As shown in FIGS. 4 and 6, the motor units 56 are mounted to a first transverse support structure 58 that interconnects the second pair of track members 34, 36. The cover unit 32 also includes a second transverse support structure 60 that interconnects the second pair of track members 34, 36. The first and second transverse support structures 58, 60 may be fixedly secured, e.g., by fasteners, to the second pair of track members 34, 36. The first and second transverse support structures 58, 60 and the second pair of track members 34, 36 form a rigid frame to add stability to the cover unit 32 to enable easy handling of the cover unit 32 by a user. As shown in FIG. 4, a cover 62 encloses the motor units 56.

Figure 8:
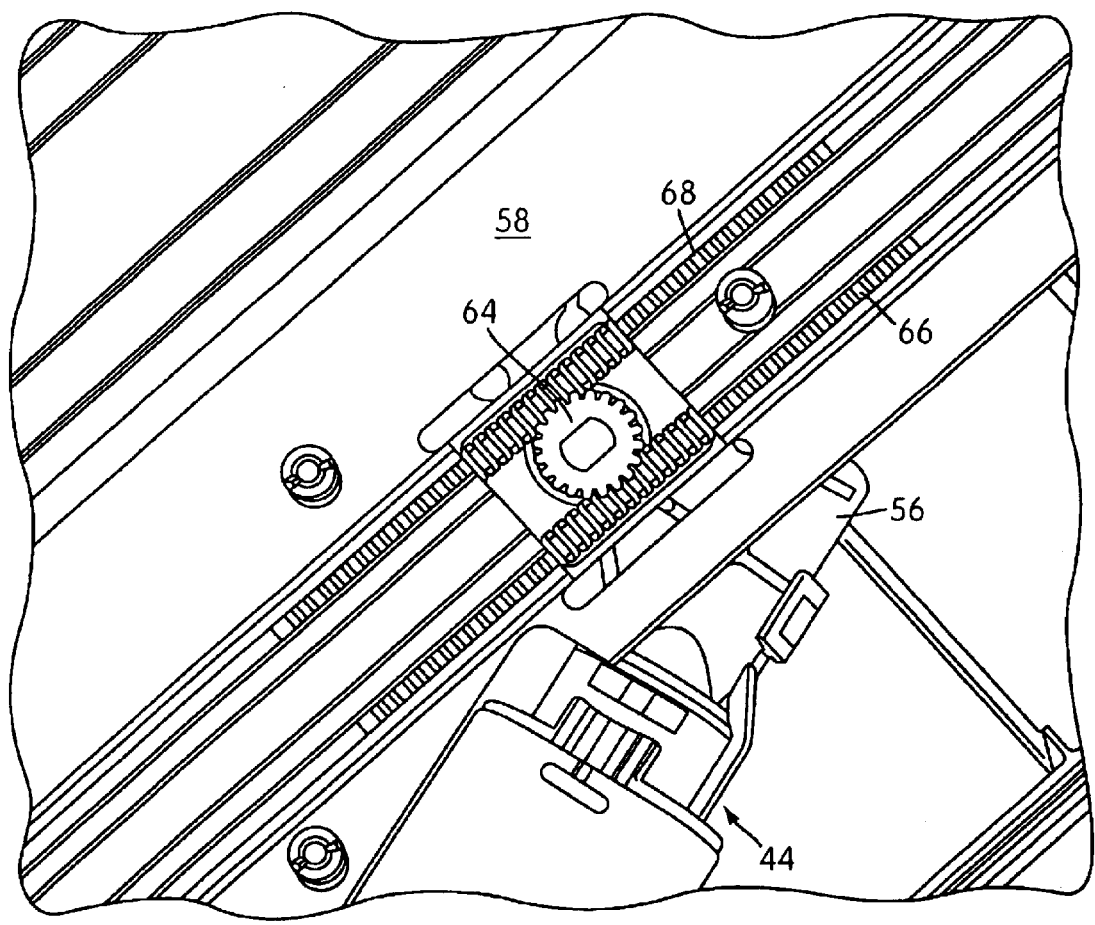
FIG. 8 is a bottom view of an embodiment of a motor of the cover assembly shown in FIG. 1 illustrating a gear of a motor unit intermeshed with drive cables of the cover assembly.

As shown in FIG. 8, a gear 64 is operatively connected to each of the motor units 56. The motor units 56 are activatable to rotate respective gears 64 in opposing rotational directions.

The motor units 56 work in series to drive a pair of flexible drive cables 66, 68 that are operatively connected thereto. As shown in FIG. 4, one of the pair of drive cables 66 extends through a conduit provided in one of the second pair of track members 34, through a first conduit provided in the first support structure 58, past the motor units 56, and into a first flexible sheath 70 connected to the first support structure 58. The other of the pair of drive cables 68 extends through a conduit provided in the other of the second pair of track members 36, through a second conduit provided in the first support structure 58, past the motor units 56, and into a second flexible sheath 72 connected to the first support structure 58. Moreover, conduits provided in the first pair of track members 28, 30 are aligned with the respective conduits in the second pair of track members 34, 36 when the cover unit 32 is mounted to the vehicle bed 12.

Figure 7:
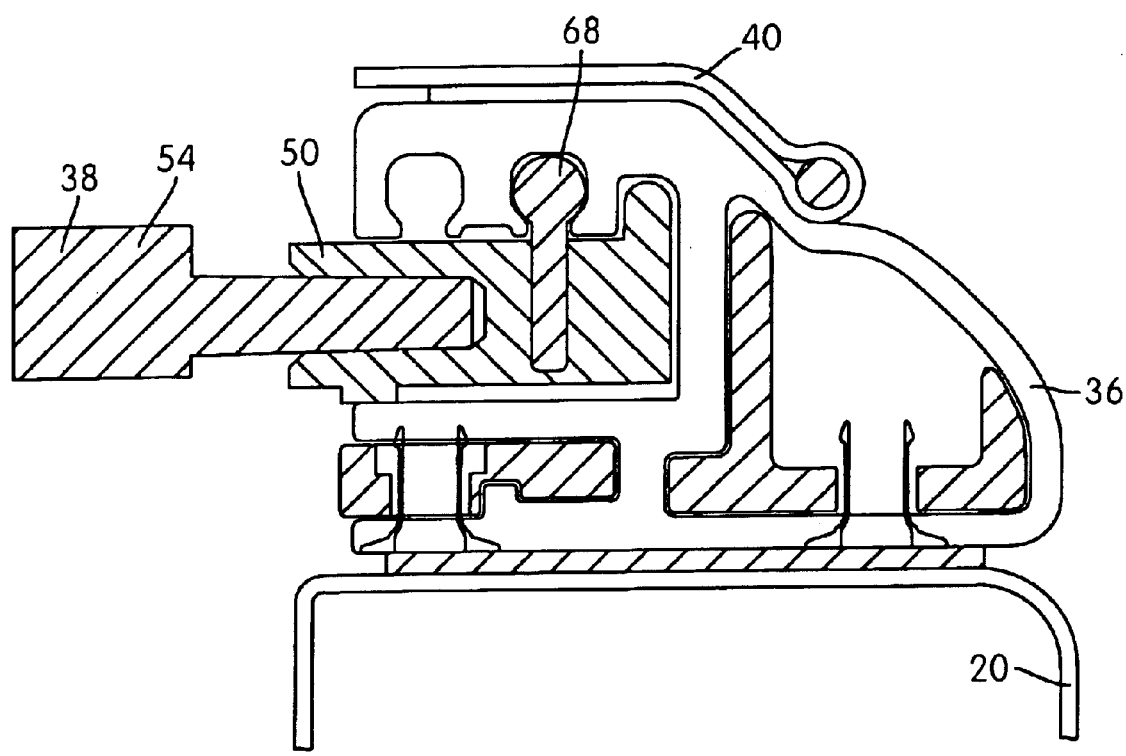
FIG. 7 is a cross-section view illustrating an embodiment of track members of the cover assembly shown in FIG. 1.

FIG. 7 illustrates an embodiment of one of the second pair of track members 34, 36. The second pair of track members 34, 36 are substantially similar to the first pair of track members 28, 30 to enable the support members 38 to move along the first and second pairs of track members 28, 30, 34, 36 to open and close the cover 40. As shown in FIG. 7, the cables 66, 68 (only the cable 68 within track member 36 being shown) have a distal end portion connected to respective sliding members 50 of the distal support member 54 through a longitudinal extending slot of the conduit to enable movement of the cables 66, 68 within respective conduits to move the distal support member 54 in the opening and closing directions. Specifically, one cable 66 is secured to one of the sliding members 50 of the distal support member 54 and the other cable 68 is secured to the other of the sliding members 50 of the distal support member 54. The first and second pairs of track members 28, 30, 34, 36 may have any suitable structure for supporting the drive cables 66, 68 and support members 38 including the distal support member 54.

As shown in FIG. 8, the cables 66, 68 are engaged with the gear 64 operatively connected to each of the motor units 56 in intermeshed relation such that (a) rotation of the gear 64 by respective motor units 56 in a first rotational direction pushes the cables 66, 68 in a distal direction within respective conduits to push the distal support member 54 in the closing direction and (b) rotation of the gear 64 in a second rotation direction pulls the cables 66, 68 in a proximal direction within respective conduits to pull the distal support member 54 in the opening direction. The cables 66, 68 may have a helical configuration in order to engage the gear 64 in intermeshed relation.

In use, rotation of the gear 64 in the first rotation direction pushes the cables 66, 68 out of respective sheaths 70, 72 and within the respective conduits provided in the first and second pairs of track members 28, 30, 34, 36 to push the distal support member 54 in the closing direction. Rotation of the gear 64 in the second direction pulls the cables 66, 68 out of the conduits in the first pair of track members 28, 30, through the conduits of the second pair of track members 34, 36 and into respective sheaths 70, 72 so as to pull the distal support member 54 in the opening direction. As a result, when the cover is in a fully collapsed position (see FIG. 1–4), the cables 66, 68 are maintained within the second pair of track members 34, 36 and sheaths 70, 72 provided by the cover unit 32. Thus, the cover unit 32 may be removed from the vehicle bed 12 with the cables 66, 68 maintained with the cover unit 32 and not associated with the first pair of track members 28, 30 on the vehicle bed 12.

The cover assembly 10 is capable of movement along the vehicle bed 12 to a series of positions. The motor units 56 and electronics associated therewith drive the cover assembly 10 to multiple intermediate open/closed positions, a fully open/collapsed position or a fully closed position, dependent upon what is stored in the vehicle bed 12. The cover assembly 10 is flexible by not constraining the interior space.

Further details of embodiments of structure and operation of the motor units 56, drive cables 66, 68, support members 38, and track members 28, 30, 34, 36 are disclosed in the incorporated U.S. Patent Application to Schall et al. However, the cover unit 32 and first pair of track members 28, 30 may have any suitable structure to allow the cover 40 to be moved along the first and second pairs of track members 28, 30, 34, 36 in opening and closing directions.

The distal support member 54 may be structured to retain the cover 40 in tension when the cover 40 is moved to a fully closed position, the distal support member 54 being adjacent the rear end wall 24 when the cover 40 is in the fully closed position. Details of embodiments for maintaining the cover 40 in tension are disclosed in the incorporated U.S. Patent Application of Schall et al.

A proximal support member, e.g., a support member positioned the closest to the front end wall 26 with respect to the remaining plurality of support members 38, may be provided to function as a cover tensioner in order to maintain tension in the cover 40. Details of embodiments of a proximal support member for maintaining the cover 40 in tension are disclosed in the incorporated U.S. Patent Application of Schall et al.

Also, the cover assembly 10 may include a plurality of fold-initiating mechanisms mounted between each pair of adjacent support members 38. Each of the fold-initiating mechanisms may have a portion that engages an adjacent portion of the cover 40 between an associated pair of adjacent support members 38 so as to initiate folding of the adjacent portion in a predetermined direction as one of the associated pair of adjacent support members 38 is being moved towards the other of the associated pair in the opening direction. Details of embodiments of fold-initiating mechanisms are disclosed in the incorporated U.S. Patent Application of Schall et al.

The first pair of elongated track members 28, 30 may be removably mounted to respective first and second side walls 18, 20 by a plurality of clamps or by a plurality of bolts, for example. Alternatively, the first pair of elongated track members 28, 30 may be fixedly mounted to respective first and second side walls 18, 20 by welding or riveting, for example. A foam pad may be positioned between each track member 28,30 and its respective side wall 18, 20 to protect the side walls 18, 20 of the vehicle and absorb vibration.

As best shown in FIGS. 4 and 5, the first pair of elongated track members 28, 30 extend along respective first and second side walls 18, 20 from a position adjacent the rear end wall 24 to an intermediate position of the side walls 18, 20. In the illustrated embodiment, the first pair of elongated track members 28, 30 have a length that is greater than a length of the second pair of elongated track members 34, 36 of the cover unit 32. However, the first pair of elongated track members 28, 30 may have a length that is less than a length of the second pair of elongated track members 34, 36 or substantially equal to a length of the second pair of elongated track members 34, 36.

As shown in FIG. 4, the at least one releasable fastener 42 is in the form of a pair of clamps 74, 76. Each clamp 74, 76 is structured to interlock with a respective cover mount 78 provided on the vehicle bed 12 so as to removably mount the cover unit 32 to the vehicle bed 12. The clamps 74, 76 are releasable to allow the cover unit 32 to be removed from the vehicle bed 12.

Figure 9:
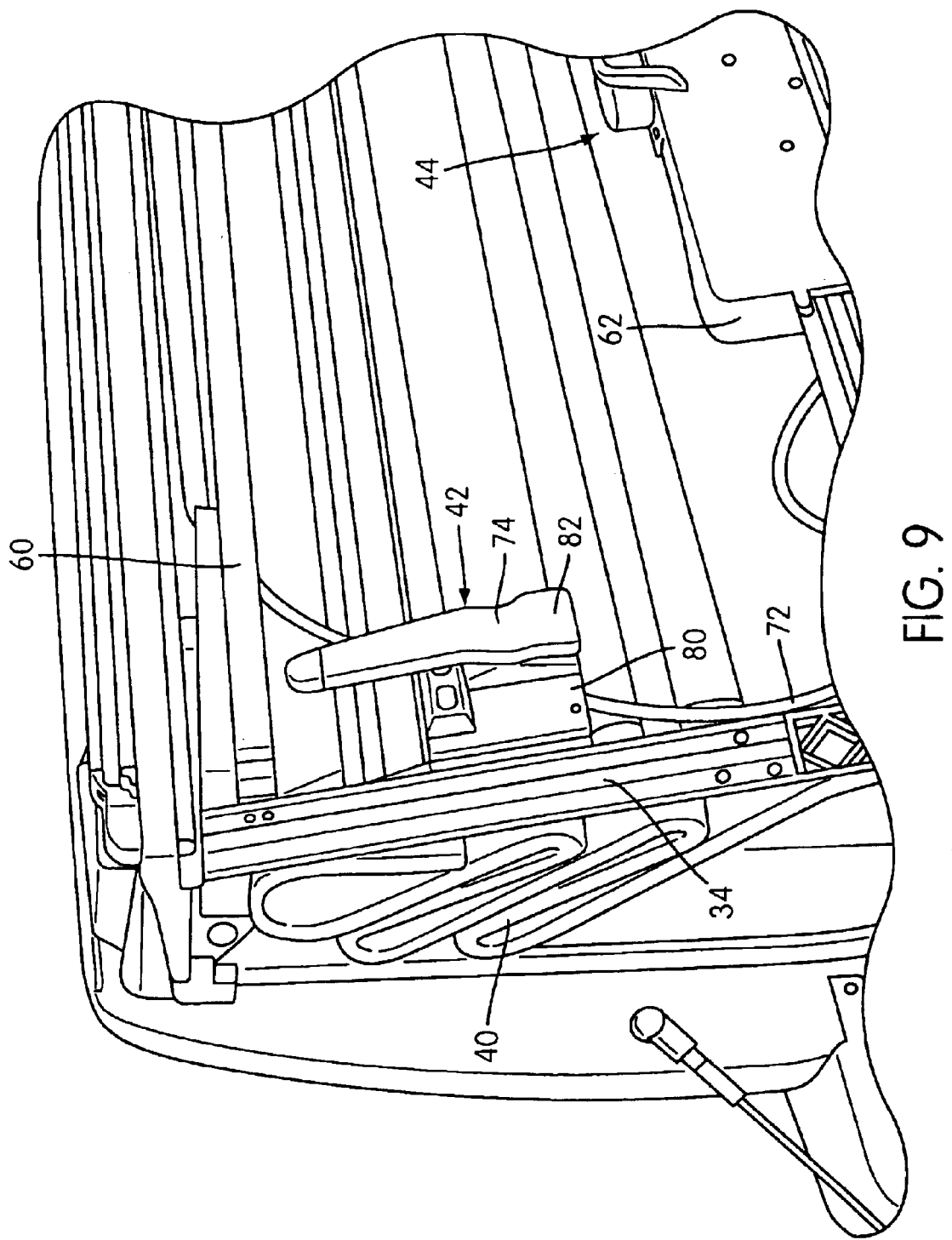
FIG. 9 is an enlarged perspective view of an embodiment of a releasable fastener of the cover unit shown in FIG. 1, the fastener in a released position.
Figure 10:
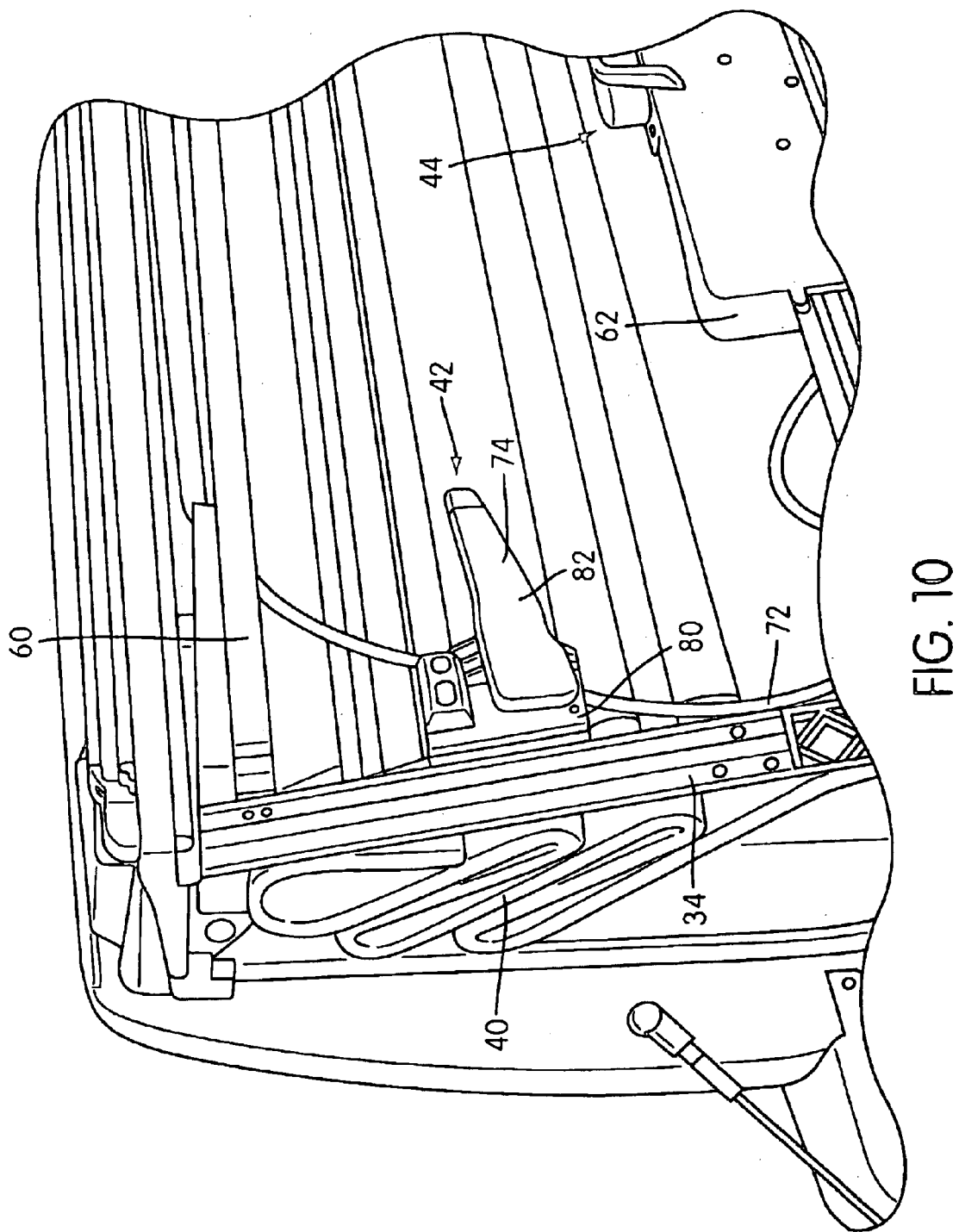
FIG. 10 is an enlarged perspective view of the fastener shown in FIG. 9, the fastener in a locked position.

Each clamp 74, 76 includes a body portion 80 that is rigidly secured to a respective one of the second pair of track members 34, 36. Each clamp 74, 76 includes a handle portion 82 that is pivotally movable between a released position, as shown in FIG. 9, and a locked position, as shown in FIG. 10. The handle portion 82 of each clamp 74, 76 is operatively connected to a locking mechanism. In the released position of the handle portion 82, the locking mechanism of each clamp 74, 76 is structured to be engagable with or removable from the cover mount 78 on the vehicle bed 12. In the locked position of the handle portion 82, the locking mechanism of each clamp 74, 76 is interlocked or clamped with respective cover mounts 78 to mount the cover unit 32 to the vehicle bed 12 and prevent removal of the cover unit 32 from the vehicle bed 12.

Figure 11:
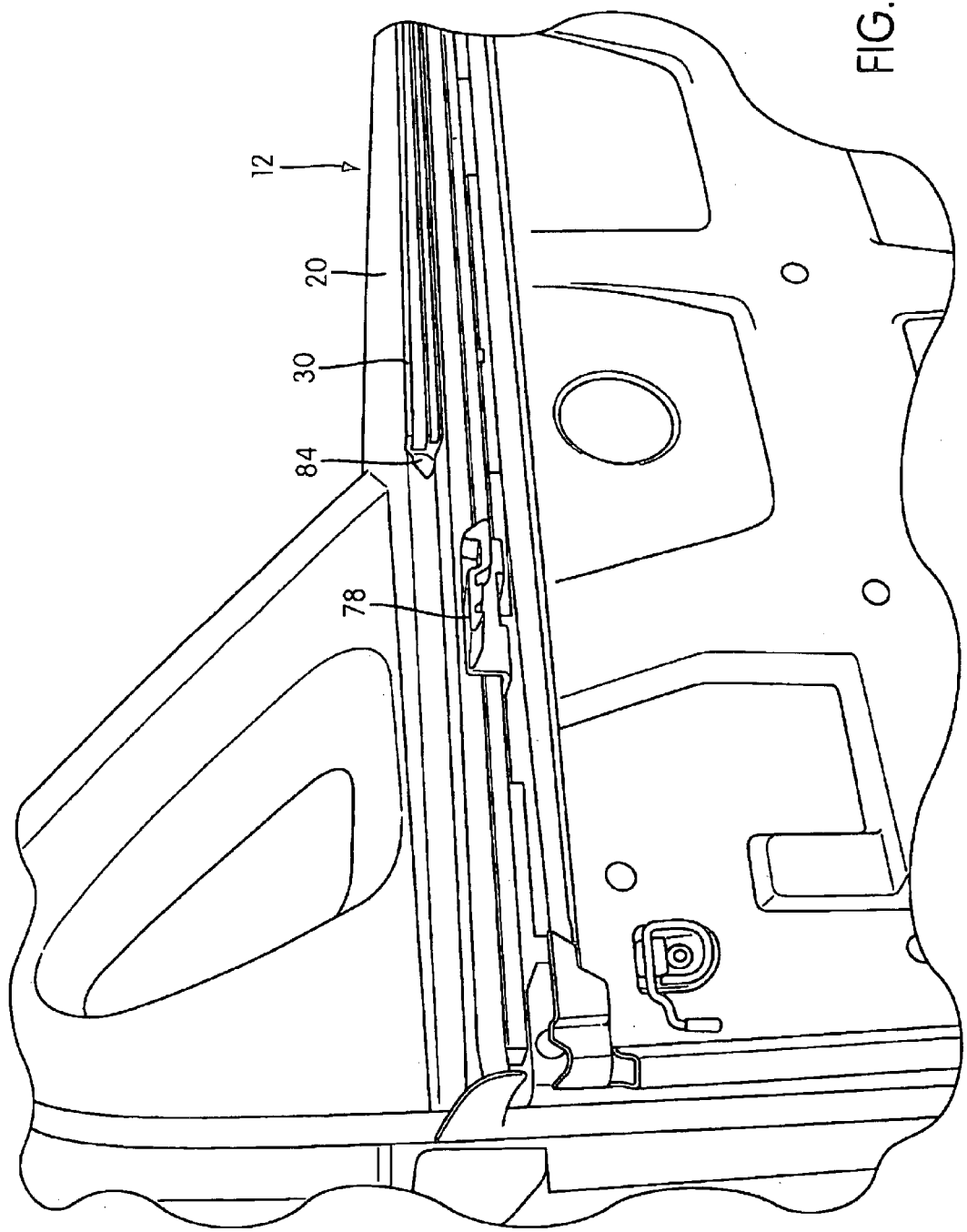
FIG. 11 is a perspective view illustrating a cover mount provided on the vehicle bed for mounting the cover unit to the vehicle bed.

As shown in FIG. 11, each cover mount 78 is in the form of a bracket. The brackets 78 may form a part of the existing vehicle bed 12 (i.e., the bracket may be built into the vehicle bed as part of its originally manufactured configuration). Alternatively, the brackets 78 may be a separate component that is rigidly mounted to the vehicle bed 12. The brackets 78 are structured to interlockingly engage with respective locking mechanisms of the clamps 74, 76 provided on the cover unit 32.

Figure 12:
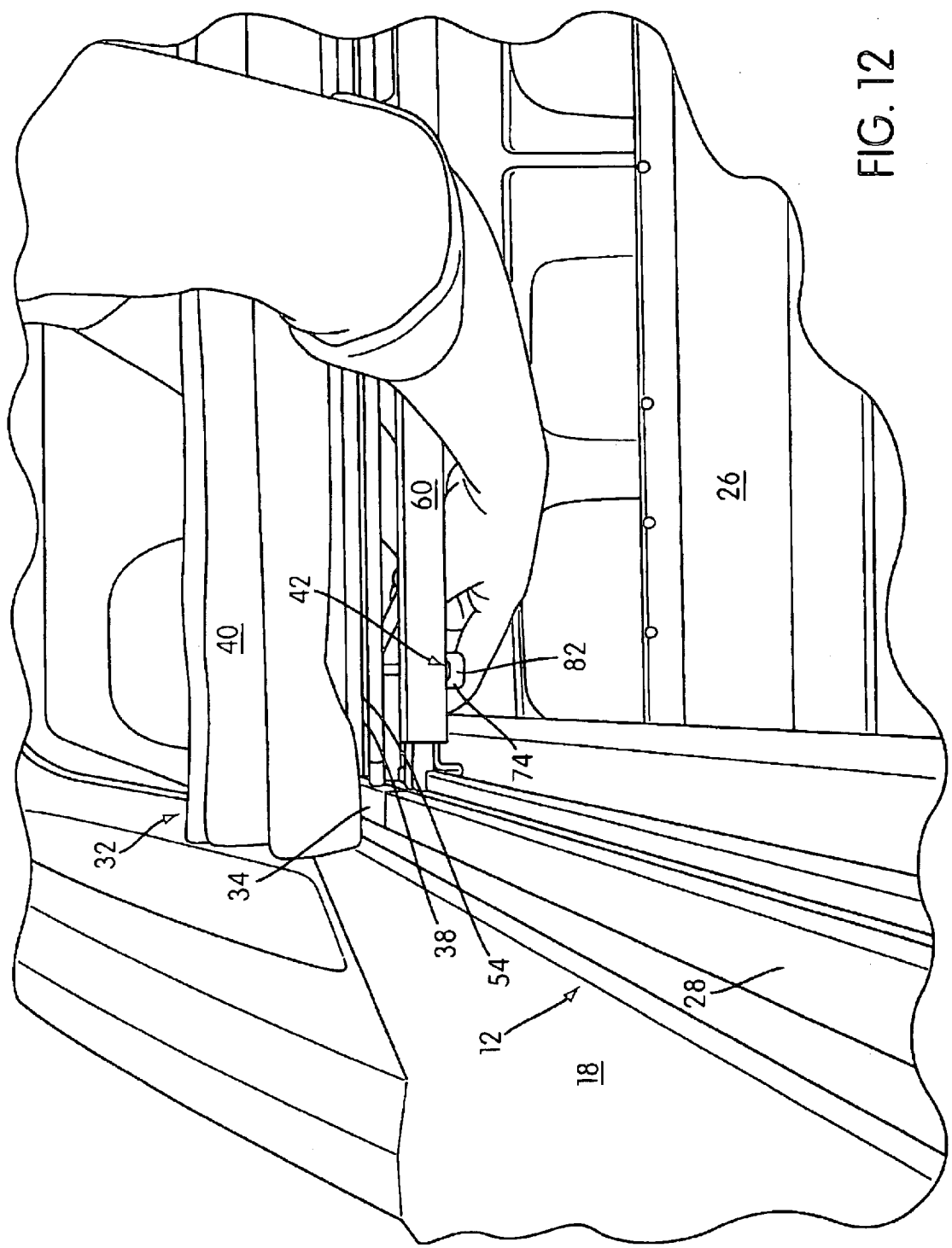
FIG. 12 is a rear perspective view illustrating a user manually moving the fastener shown in FIGS. 9 and 10 between a released position and a locked position to removably mount the cover unit to the vehicle bed.

As shown in FIG. 12, the handle portion 82 of the clamps 74, 76 may be manually moved between the released and locked positions to remove and mount the cover unit 32 to the vehicle bed 12, respectively.

However, the fastener 42 may have any suitable structure to removably mount the cover unit 32 to the vehicle bed 12, e.g., tie-bar, bolt, etc.

An interlocking element may be provided on the first pair of track members 28, 30 so as to align the first pair of track members 28, 30 with the second pair of track members 34, 36 provided on the cover unit 32. Specifically, as shown in FIG. 11, the first pair of track members 28, 30 (only the track member 30 being shown) each include a protrusion 84 that is adapted to interlock with a recess provided in each of the second pair of track members 34, 36 so as to align the first and second pairs of track members 28, 30, 34, 36. Once the first and second pairs of track members 28, 30, 34, 36 are aligned, the clamps 74, 76 may be moved to the locked position to mount the cover unit 32 to the vehicle bed 12.

When the cover unit 32 is in its operative position installed to the vehicle bed 12, the motor units 56 are activatable to move the distal support member 54 along the first and second pairs of track members 28, 30, 34, 36 between covering and collapsed positions with respect to the vehicle bed 12. The cover unit 32 may be removed from the vehicle bed 12 when it is moved to a collapsed position. As best shown in FIG. 4, when the cover unit 32 is removed from the vehicle bed 12, the cover 40, motor 44, drive cables 66, 68, support members 38, and clamps 74, 76 are all contained within the frame provided by the second pair of track members 34, 36 and first and second transverse support structures 58, 60. This compact design of the cover unit 32 allows the user to easily manipulate the cover unit 32 for storage purposes.

The clamps 74, 76 may be designed to establish an electrical connection between the motor units 56 and the vehicle's electrical power system when the clamps 74, 76 are moved to a locked position. This can prevent inadvertent operation of the cover assembly 10 when the cover unit 32 is not securely mounted to the vehicle bed 12.

Also, the clamps 74, 76 may be structured such that the handle portion 82 is only movable between released and locked positions when the cover 40 is in the fully collapsed position. This can prevent the user from removing the cover unit 32 from the vehicle bed 12 when the cover 40 is in a closed position where support members 38 are located on the first pair of track members 28, 30.

Another embodiment of the cover assembly, indicated as 210, having a cover unit 232 is illustrated in FIGS. 13–22. In this embodiment, the at least one fastener 242 of the cover unit 232 includes first and second fastening assemblies 274 (only one of the fastening assemblies 274 being shown). Each of the first and second fastening assemblies 274 have an interlocking slider member 277 structured to be movable into interlocking engagement with a respective one of the first pair of track members 28, 30 provided on the vehicle bed 12 so as to align and interlock the first and second pairs of track members 28, 30, 34, 36, as will be further discussed. Also, the vehicle bed 12 includes a pair of cover mounts 278 structured to engage with locking structures 280 provided on each of the second pair of track members 34, 36 to facilitate alignment of the cover unit 232 with the vehicle bed 12. The remaining elements of the cover assembly 210 are similar to the elements of the cover assembly 10 and are indicated with similar reference numerals.

Figure 13:
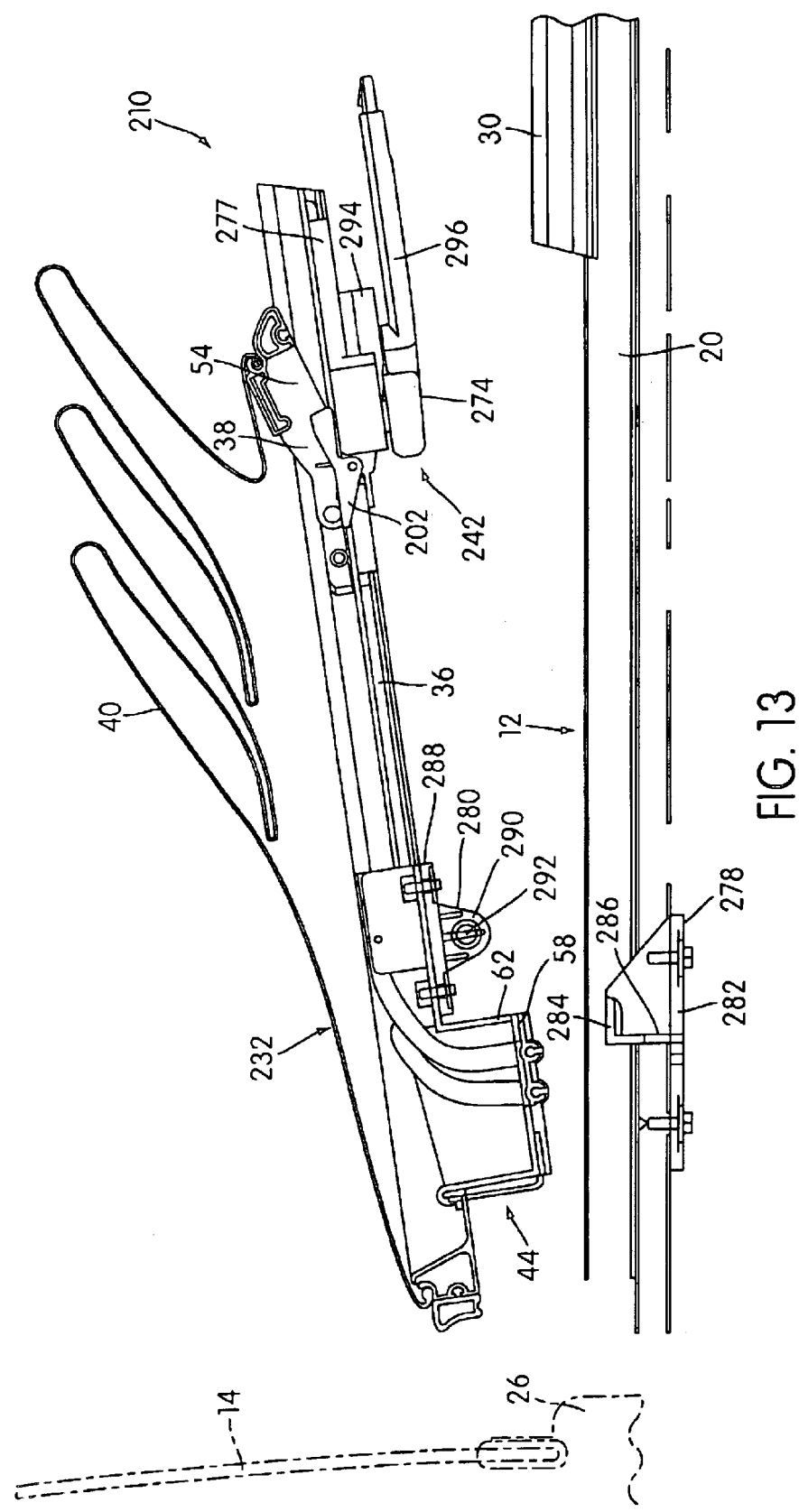
FIG. 13 is a side view illustrating another embodiment of cover assembly for a vehicle bed, the cover unit of the cover assembly removed from the vehicle bed.

As best shown in FIG. 13, the first pair of track members 28, 30 (only track member 30 being shown) extend along respective first and second side walls 18, 20 of the vehicle bed 12 from an intermediate position of respective side walls 18, 20 to a position adjacent the rear end wall 24. The cover mounts 278 are rigidly mounted to respective first and second side walls 18, 20 at positions adjacent the front end wall 26. Specifically, each cover mount 278 includes a first plate 282 that is rigidly mounted to a respective side wall 18, 20 by fasteners, for example. Each cover mount 278 also includes an upwardly and outwardly extending second plate 284 that is rigidly connected to the first plate 282. Thus, the first and second plates 282, 284 define an interior space 286 therebetween.

As best shown in FIG. 13, the cover unit 232 includes first and second fastening assemblies 274 mounted to respective ones of the second pair of track members 34, 36 at positions distal from the motor 44. The cover unit 232 also includes locking structures 280 mounted to respective ones of the second pair of track members 34, 36 at positions adjacent the motor 44.

Each locking structure 280 includes a first plate 288 that is rigidly mounted to a respective one of the second pair of track members 34, 36 by fasteners, for example. Each locking structure 280 also includes an outwardly extending second plate 290 that is rigidly connected to the first plate 288. The second plate 290 includes a pin 292 attached thereto.

Figure 14:
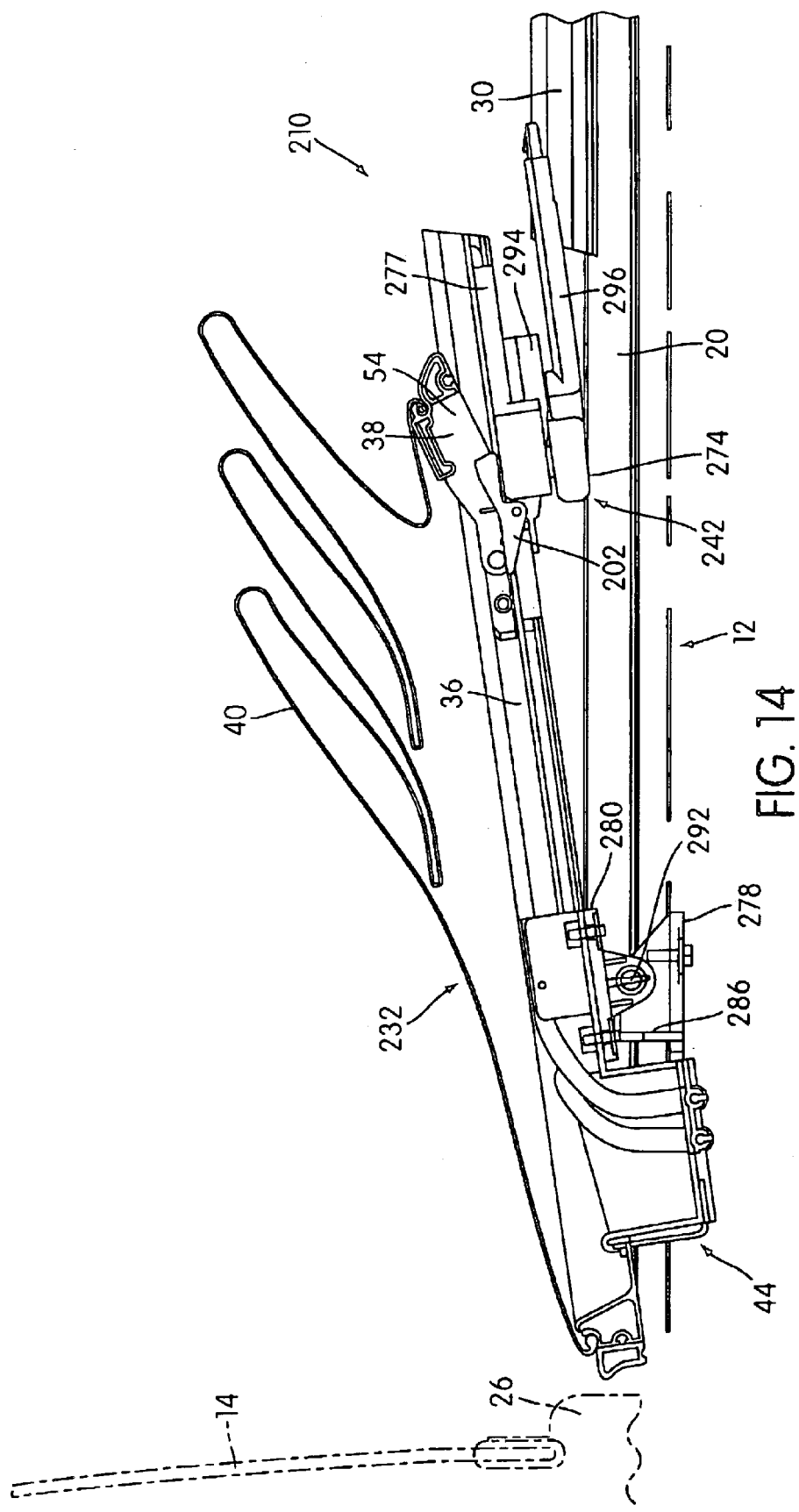
FIG. 14 is a side view illustrating the cover unit of FIG. 13 being engaged with cover mounts provided on the vehicle bed.
Figure 15:
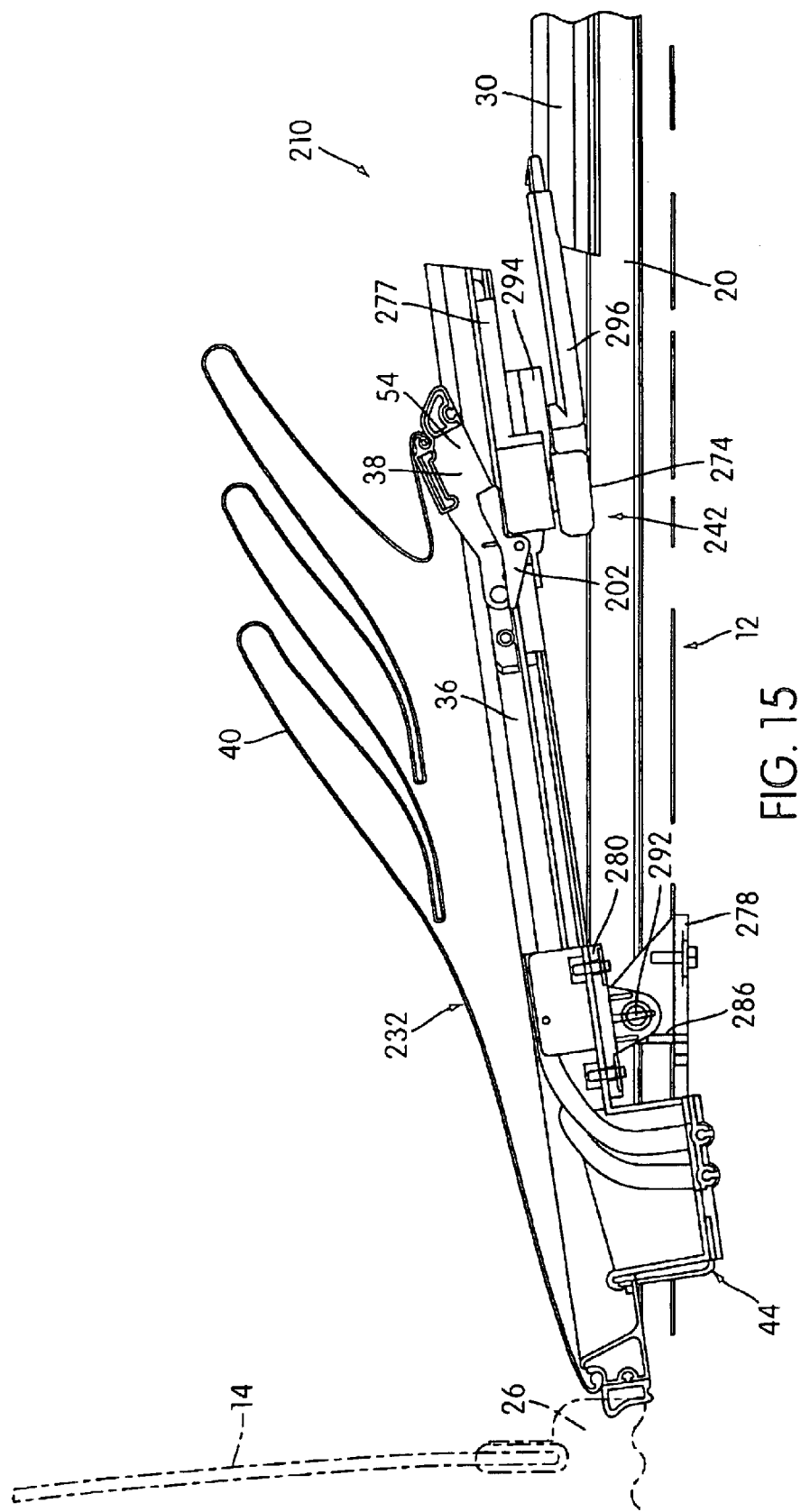
FIG. 15 is a side view illustrating the cover unit of FIG. 13 engaged with cover mounts provided on the vehicle bed.
Figure 16:
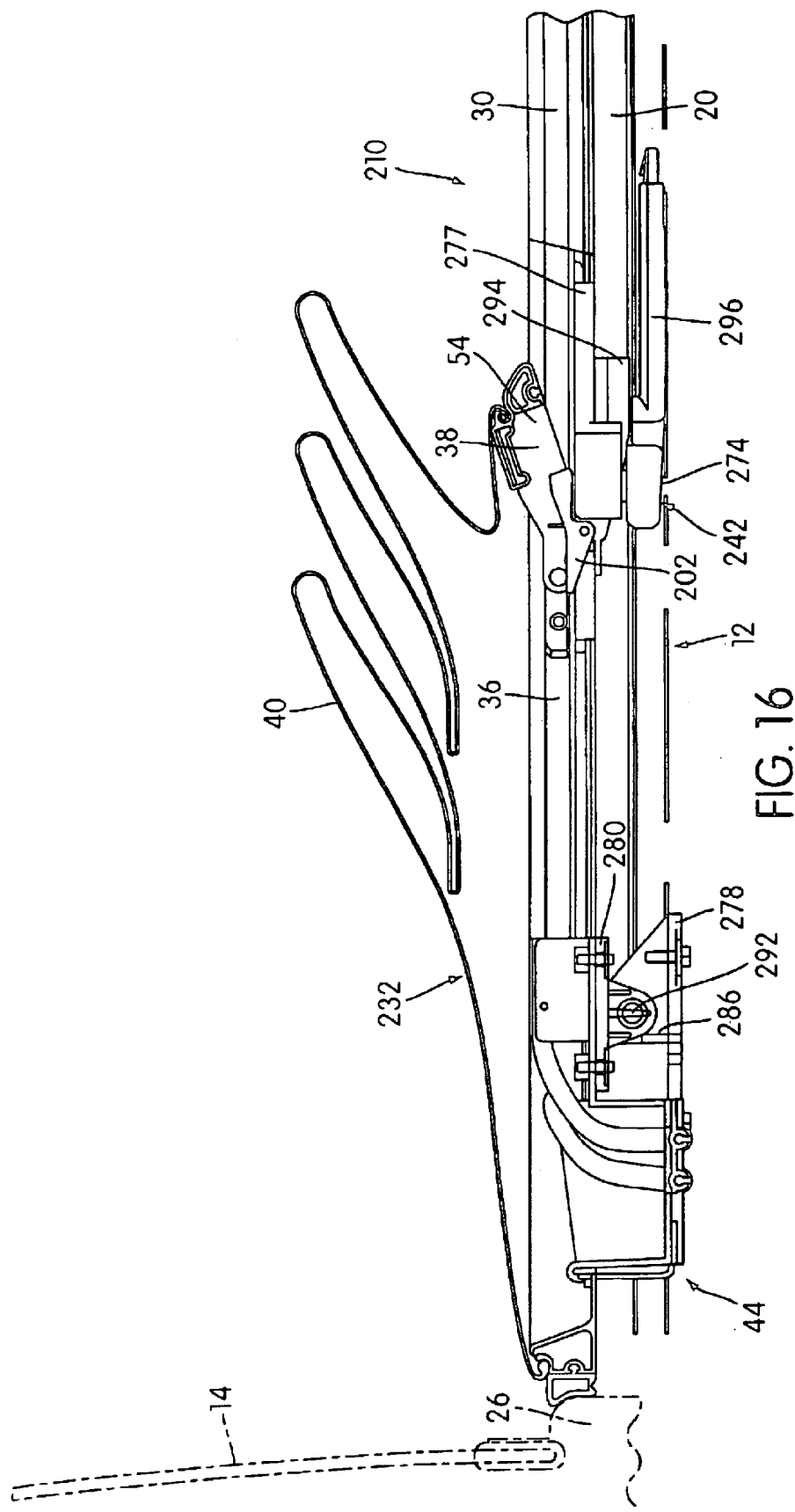
FIG. 16 is a side view illustrating the cover unit of FIG. 13 installed in an operative position on the vehicle bed.

When the cover unit 232 is mounted to the vehicle bed 12, the pins 292 of each locking structure 280 are first inserted into the interior space 286 of respective cover mounts 278 provided on the vehicle bed 12, as shown in FIG. 14. The cover unit 232 may be slightly angled with respect to the vehicle bed 12 to facilitate insertion of the pins 292 into the interior spaces 286 of respective cover mounts 278. As shown in FIG. 15, the cover unit 232 is moved towards the front end wall 26 until the pins 292 of the locking structures 280 are substantially within the interior spaces of respective cover mounts 278, e.g., the pins 292 of the locking structures 280 engage inner surfaces of the second plate 284 of respective cover mounts 278. Then, the cover unit 232 may be pivoted downwardly into engagement with the vehicle bed 12 which positions the second pair of track members 34, 36 adjacent the first pair of track members 28, 30 on the vehicle bed 12, as shown in FIG. 16. At this point, the first and second fastening assemblies 274 may be actuated to move the interlocking slider member 277 into interlocking engagement with a respective one of the first pair of track members 28, 30 so as to align and interlock the first and second pairs of track members 28, 30, 34, 36, as will be further discussed.

Similarly, to remove the cover unit 232 from the vehicle bed 12, the first and second fastening assemblies 274 are actuated to move the interlocking slider member 277 out of interlocking engagement with a respective one of the first pair of track members 28, 30. The cover unit 232 may be pivoted upwardly away from the vehicle bed 12 and then outwardly away from the cover mounts 278 to release the pins 292 of the locking structures 280 out of the interior spaces 286 of respective cover mounts 278.

Figure 17:
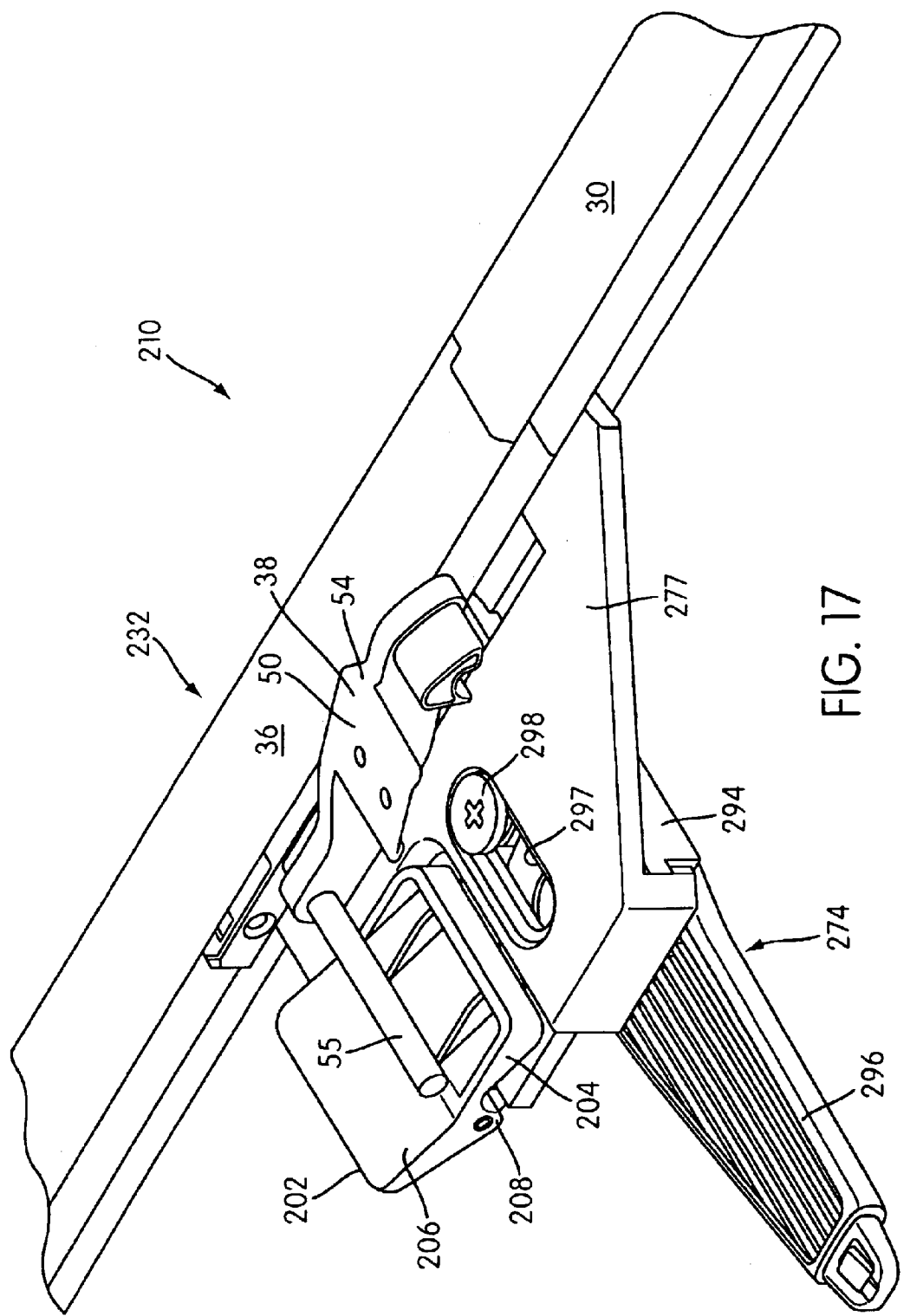
FIG. 17 is an enlarged perspective view of a releasable fastener of the cover unit shown in FIG. 13, the fastener in a locked position to removably mount the cover unit to the vehicle bed.
Figure 18:
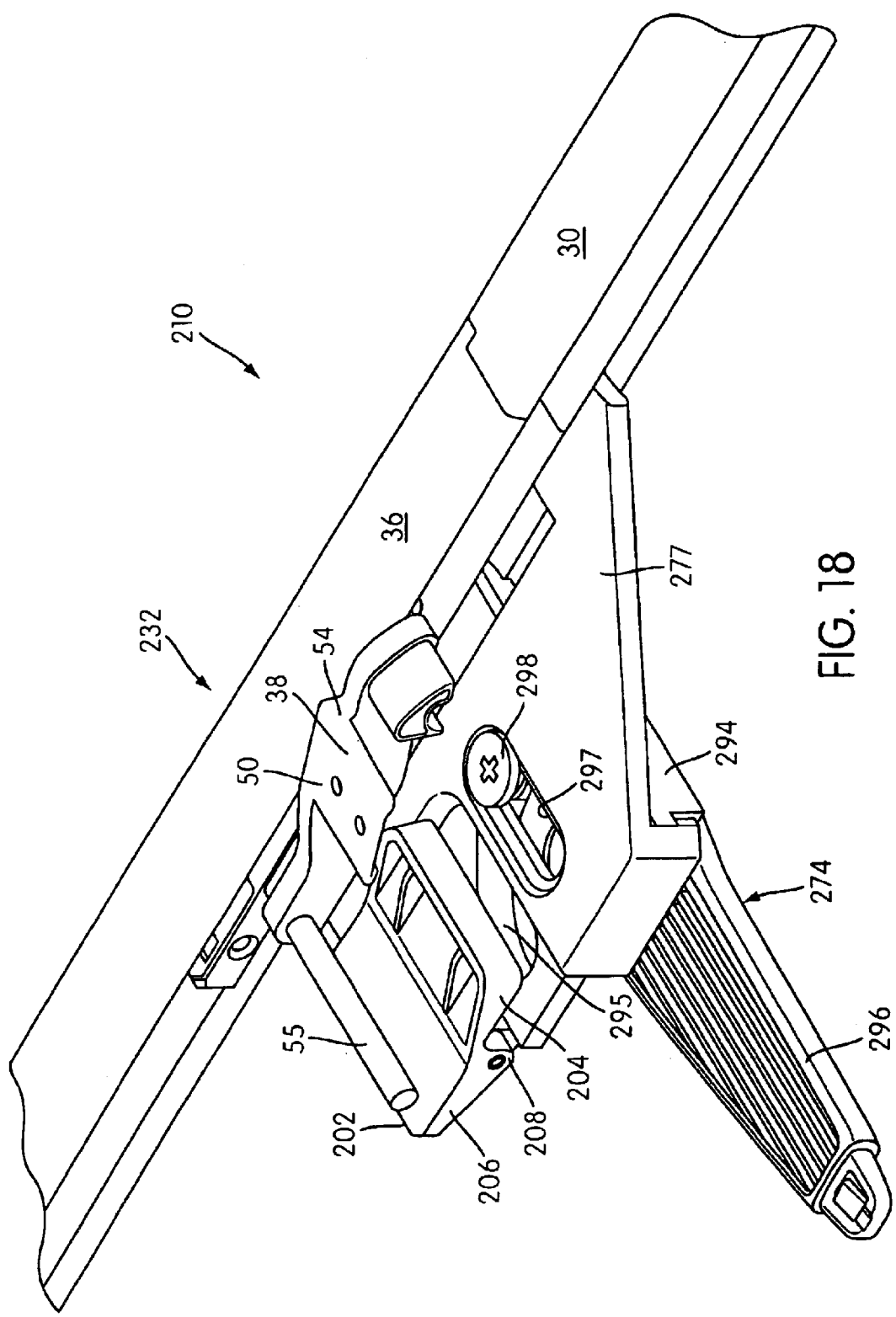
FIG. 18 is a enlarged perspective view of the fastener shown in FIG. 17 illustrating a distal one of the support members of the cover unit engaging the fastener to allow the fastener to be moved from a locked position to a released position.
Figure 19:
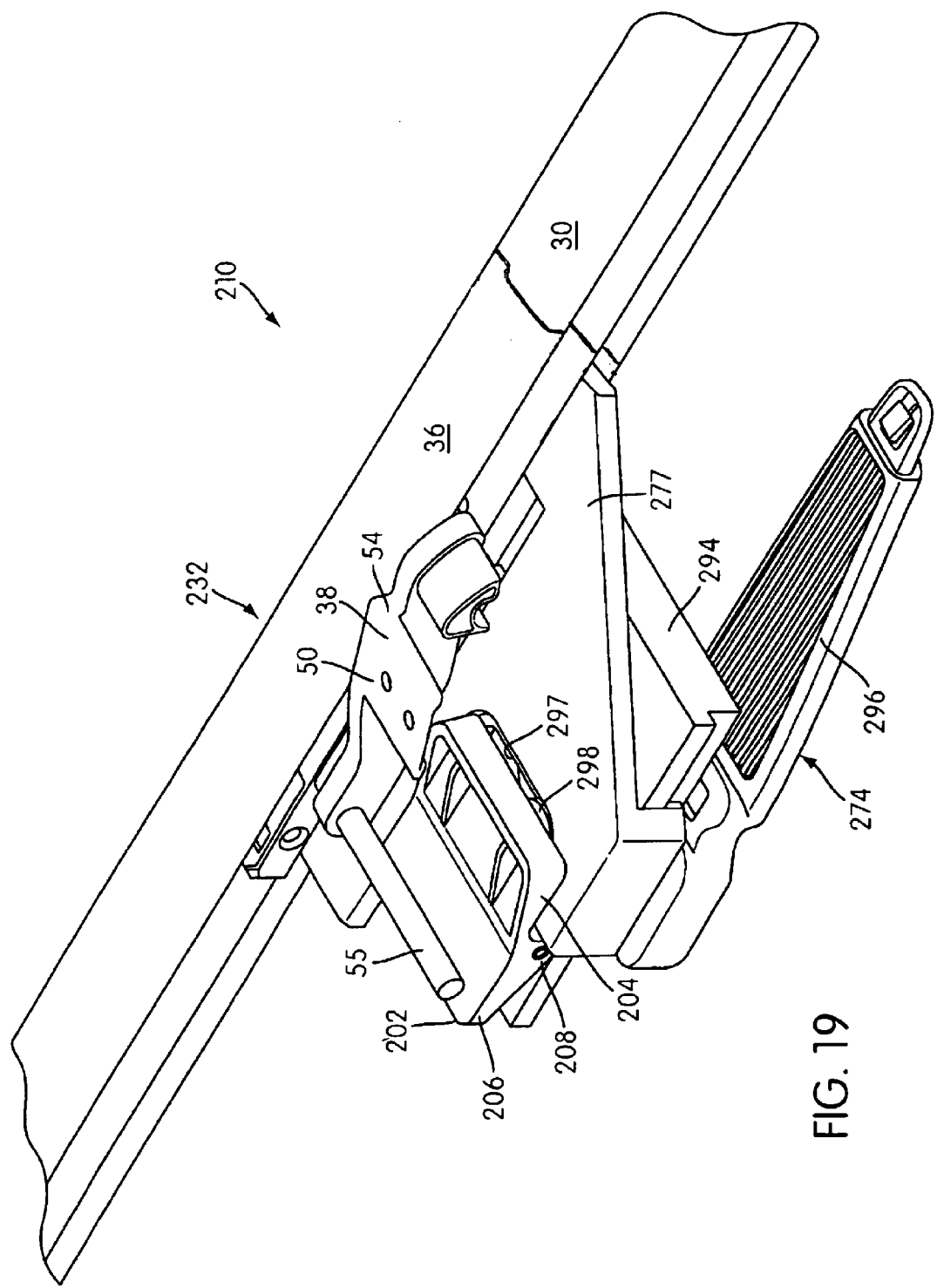
FIG. 19 is an enlarged perspective view illustrating the fastener shown in FIG. 17, the fastener in a released position that releases a slider member thereof from interlocking engagement with a track member provided on the vehicle bed to allow the cover unit to be removed from the vehicle bed.
Figure 20:
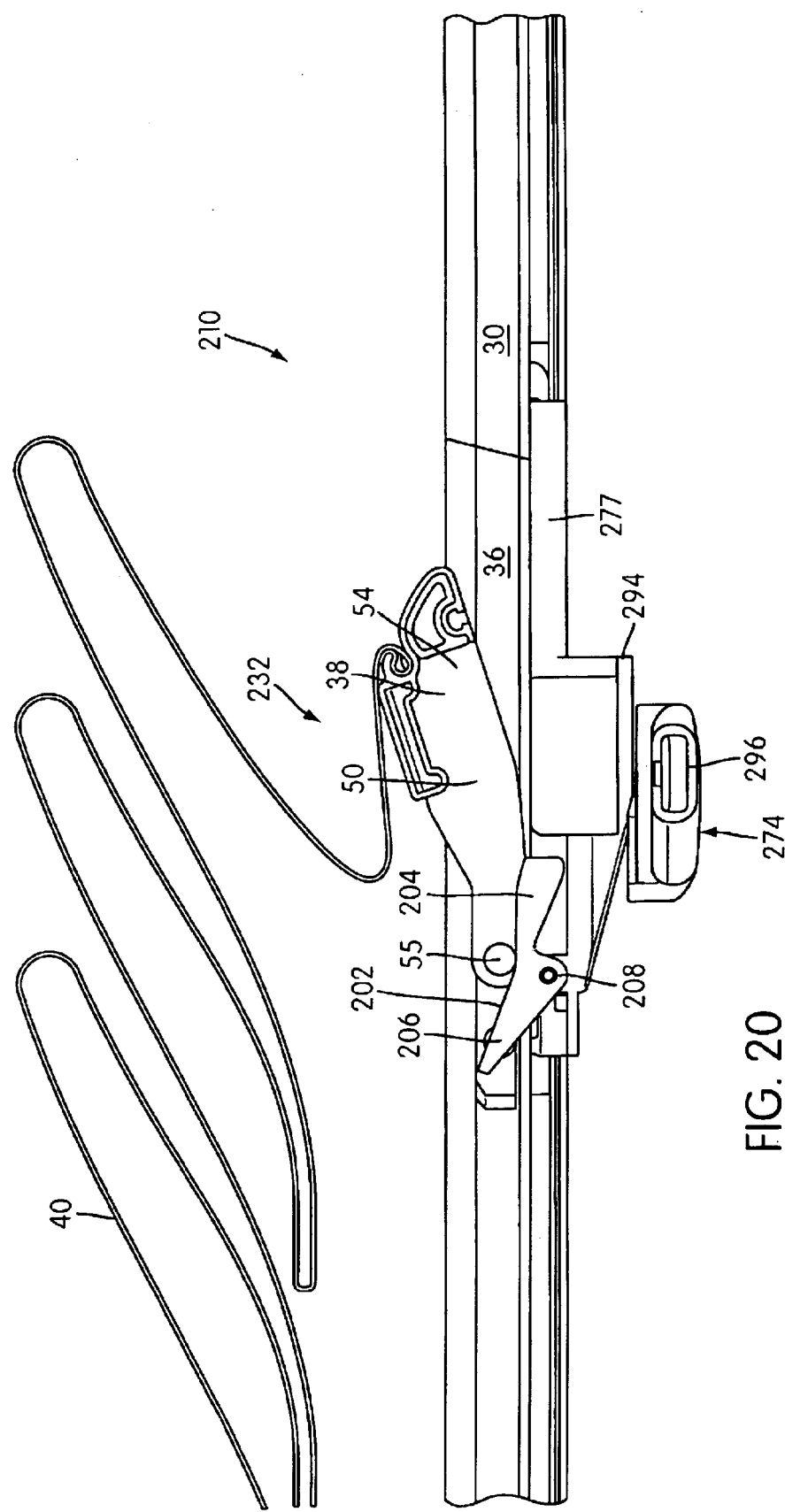
FIG. 20 is a side view of the fastener shown in FIG. 17, the fastener in a locked position to removably mount the cover unit to the vehicle bed.
Figure 22:
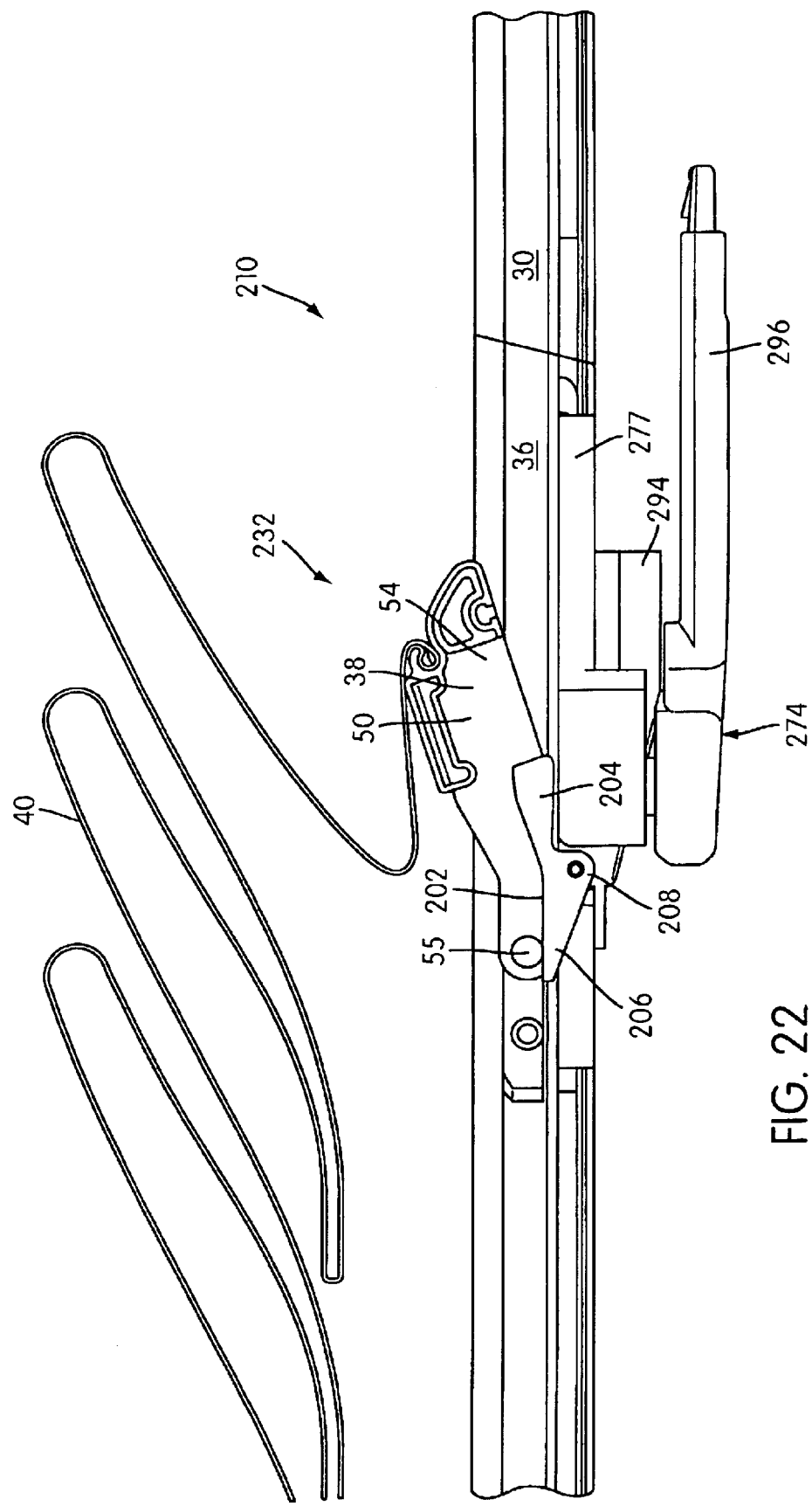
FIG. 22 is a side view of the fastener shown in FIG. 17, the fastener in a released position that releases a slider member thereof from interlocking engagement with a track member provided on the vehicle bed to allow the cover unit to be removed from the vehicle bed.

Details of the first and second fastening assemblies 274 will now be described in greater detail. As shown in FIGS. 17–19, each fastening assembly 274 includes a mounting structure 294 that is rigidly mounted to a respective one of the second pair of track members 34, 36 by fasteners, for example. An interlocking slider member 277 is slidably engaged with the mounting structure 294. When the cover unit 232 is mounted to the vehicle bed 12, the interlocking slider member 277 is movable into interlocking engagement with a respective one of the first pair of track members 28, 30 (as shown in FIGS. 17 and 20) to align and interlock the first and second pairs of track members 28, 30, 34, 36. The interlocking slider member 277 is also movable out of interlocking engagement with a respective one of the first pair of track members 28, 30 (as shown in FIGS. 19 and 22) to allow the cover unit 232 to be removed from the vehicle bed 12.

Each fastening assembly 274 includes a handle 296 pivotally mounted to the mounting structure 294 for pivotal movement between a locked position, as shown in FIG. 17, and a released position, as shown in FIG. 19. The handle 296 is operatively engaged with the slider member 277 to control the movement of the slider member 277 into and out of interlocking engagement with a respective one of the first pair of track members 28, 30. That is, in the locked position of the handle 296, the slider member 277 is interlocked with a respective one of the first pair of track members 28, 30. In the released position of the handle 296, the slider member 277 is released from interlocking engagement with a respective one of the first pair of track members 28, 30.

Specifically, a fastener 298 is fixedly mounted to an end of the handle 296. As best shown in FIG. 18, the fastener 298 extends through an arcuate slot 295 provided in the mounting structure 294 and through an elongated slot 297 provided in the slider member 277. Pivotal movement of the handle 296 between the locked and released positions moves the fastener 298 along the arcuate slot 295 of the mounting structure 294 which causes longitudinal movement of the slider member 277 with respect to the mounting structure 294 as the fastener 298 moves from one end of the elongated slot 297 to the other end of the elongated slot 297 (see sequence of movement from FIG. 17 to FIG. 19).

A lock block 202 is pivotally mounted to the mounting structure 294 for pivotal movement between a locking position, as shown in FIG. 17, and an unlocking position, as shown in FIGS. 18 and 19. The lock block 202 is structured to control movement of the handle 296 between locked and released positions so that the handle 296 is movable only when the cover 40 is in a fully collapsed position. This prevents the user from removing the cover unit 232 from the vehicle bed 12 when the cover 40 is in a covering position, e.g., support members 38 in the first pair of track members 28, 30.

Specifically, the lock block 202 includes a first end portion 204, a second end portion 206, and an intermediate portion 208. The intermediate portion 208 is pivotally mounted to the mounting portion 294 to allow the pivotal movement of the lock block 202 between the locking and unlocking positions. The lock block 202 is biased to the locking position by a spring, for example.

As shown in FIGS. 17 and 20, when the cover unit 232 is mounted to the vehicle bed 12 and the handle 296 is in the locked position, the slider member 277 is interlocked with a respective one of the first pair of track members 28, 30. Moreover, the lock block 202, in its locking position, has its first end portion 204 positioned behind the slider member 277 to prevent the slider member 277 from movement out of interlocking engagement with a respective one of the first pair of track members 28, 30 which in turn prevents rotation of the handle 296 (due to their interconnection described above).

Figure 21:
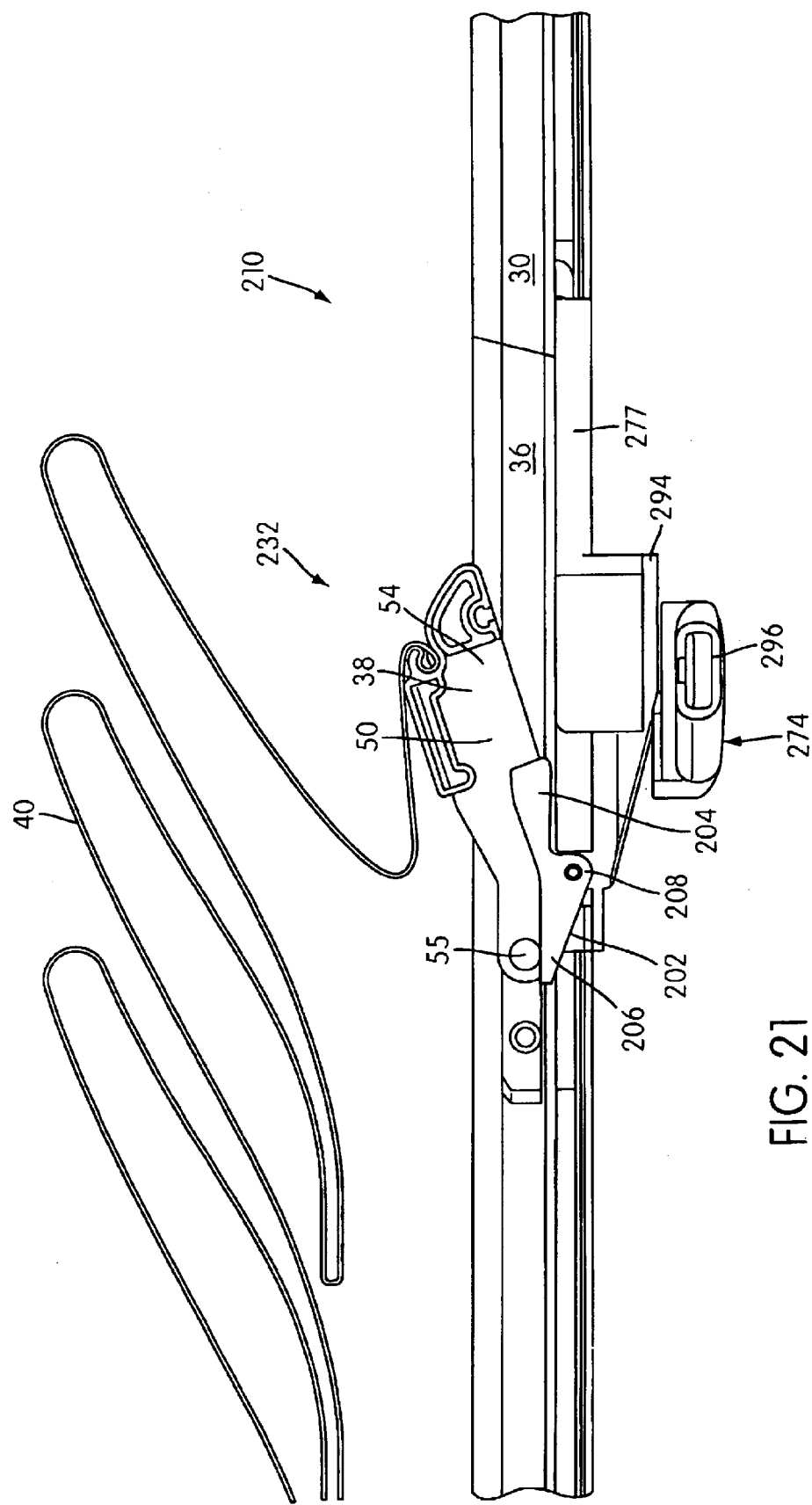
FIG. 21 is a side view of the fastener shown in FIG. 17 illustrating a distal one of the support members of the cover unit engaging the fastener to allow the fastener to be moved from the locked position to a released position.

As shown in FIGS. 18 and 21, when the cover 40 is moved to the fully collapsed position, an actuator, such as a rod 55, on the sliding member 50 of the distal support member 54 is structured to engage the second end portion 206 of the lock block 202 to rotate the lock block 202 from the locking position to the unlocking position against biasing therefrom. This moves the lock block 202 to a position that allows movement of the slider member 277 out of interlocking engagement with a respective one of the first pair of track members 28, 30 which in turn allows rotation of the handle 296.

As shown in FIGS. 19 and 22, the handle 296 has been moved to the released position, which moves the slider member 277 out of interlocking engagement with a respective one of the first pair of track members 28, 30 on the vehicle bed 12. Thus, the cover unit 232 may be removed from the vehicle bed 12.

Thus, the lock block 202 functions to lock the slider member 277 and hence the handle 296 in the locked position until the cover 40 is moved to a fully collapsed position. Once the cover 40 is fully collapsed, the lock block 202 is moved to an unlocking position that allow movement of the handle 296 into a released position for removal of the cover unit 232 form the vehicle bed 12.

It can thus be appreciated that the aspects of the present invention have been fully and effectively accomplished. The foregoing specific embodiments have been provided to illustrate the structural and functional principles of the present invention and are not intended to be limiting. To the contrary, the present invention is intended to encompass all modifications, alterations, and substitutions within the spirit and scope of the appended claims.

What is claimed is:

1. A method for mounting a cover assembly to a vehicle bed having at least opposing first and second side walls and a floor, the side walls and the floor defining an interior space having an upwardly facing opening, the method comprising:

mounting a first pair of elongated track members to the first and second side walls, the first pair of elongated track members each having a cable receiving conduit;

providing a removable cover unit comprising:
(i) a second pair of elongated track members each having a cable receiving conduit;
(ii) a plurality of transverse support members, each of the plurality of support members having first and second end portions, the first end portions being movably mounted on one of the second pair of track members and the second end portions being movably mounted on the other of the second pair of track members;
(iii) a flexible cover mounted to the plurality of transverse support members;
(iv) at least one motor; and
(v) a pair of flexible drive cables respectively received in the cable receiving conduits of the second pair of track members, the drive cables being operatively connected to both the at least one motor and the plurality of support members; and removably mounting the cover unit in an operative position to the vehicle bed such that the second pair of track members are aligned with the first pair of track members with the cable receiving conduits of the first and second pairs of track members aligned with one another so that the support members can be selectively moved along the first and second pairs of track members by operating the at least one motor to drive the drive cables within the aligned cable receiving conduits to move the plurality of transverse support members along the aligned fist and second pairs of track members and extend and retract the flexible cover for opening and closing the vehicle bed.

2. A cover assembly for a vehicle bed having at least opposing first and second side walls and a floor, the side walls and the floor defining an interior space, having an upwardly facing opening, the cover assembly comprising:

a first pair of elongated track members mountable to the first and second side walls, the first pair of elongated track members each having a cable receiving conduit; and a removable cover unit comprising:
(i) a second pair of elongated track members each having a cable receiving conduit;
(ii) a plurality of transverse support members, each of the plurality of support members having first and second end portions, the first end portions being movably mounted on one of the second pair of track members and the second end portions being movably mounted on the other of the second pair of track members;
(iii) a flexible cover mounted to the plurality of transverse support members;

the cover unit being constructed to be removably mounted in an operative position to the vehicle bed with the second pair of track members being aligned with the first pair of track members so that the support members can move along the first and second pairs of track members to extend and retract the flexible cover for opening and closing the vehicle bed, wherein the cable receiving conduits of the first and second pairs of track members are aligned with one another when the removable cover unit is in the operative position;

(iv) at least one motor; and (v) a pair of flexible drive cables respectively received in the cable receiving conduits of the second pair of track members, the drive cables being operatively connected to the at least one motor and the plurality of support members to enable the at least one motor, when the cover unit is in the operative position, to drive the drive cables within the aligned cable receiving conduits to move the plurality of traverse support members along the aligned first and second pairs of track members and extend and retract the flexible cover for opening and closing the vehicle bed.

3. A cover assembly according to claim 2, wherein the support members are movably arranged on the first and second pairs of track members such that (1) movement of a distal one of the support members in an opening direction causes the distal support member to push each of the other support members in a sequential manner in the opening direction and hence sequentially collapse the cover secured thereto, thereby facilitating access to the interior space of the vehicle bed, and (2) movement of the distal support member in a closing direction causes the distal support member to pull the other support members in a sequential manner in the closing direction and hence sequentially moves the cover secured thereto into covering relation to the interior space of the vehicle bed, thereby inhibiting access to the interior space of the vehicle bed;

the distal support member being operatively connected at its first and second end portions to the flexible drive cables to enable the at least one motor to move the distal support member in the opening and closing directions.

4. A cover assembly according to claim 2, wherein the first pair of elongated track members have a length that is greater than a length of the second pair of elongated track members of the cover unit.

5. A cover assembly according to claim 2, wherein the cover unit includes a pair of locking structures each having a pin structured to engage with a respective cover mount provided on the vehicle bed to facilitate alignment of the cover unit with the vehicle bed.

6. A cover assembly according to claim 2, further comprising at least one releasable fastener constructed to secure the cover unit in the operative position and to be releasable to allow the cover unit to be removed from the vehicle bed.

7. A cover assembly according to claim 6, wherein the at least one releasable fastener includes a pair of clamps each structured to interlock with respective cover mounts provided on the vehicle bed.

8. A cover assembly according to claim 7, wherein the cover mounts form a part of the existing vehicle bed.

9. A cover assembly according to claim 7, wherein each clamp includes a handle portion that can be manually moved between a released position and a locked position, the clamp being interlocked with the respective cover mount in the locked position and being releasable from the respective cover mount in the released position.

10. A cover assembly according to claim 6, wherein the at least one releasable fastener includes first and second fastening assemblies each having an interlocking slider member structured to be movable into interlocking engagement with a respective one of the first pair of track members provided on the vehicle bed so as to align and interlock the first and second pairs of track members.

11. A cover assembly according to claim 10, wherein each fastening assembly includes a handle operatively engaged with a respective said slider member to control the movement of the slider member into and out of interlocking engagement with the respective one of the first pair of track members, the handle being movable between (a) a locked position to move the slider member into interlocking engagement with the respective one of the first pair of track members and (b) a released position to move the slider member out of interlocking engagement with the respective one of the first pair of track members.

12. A cover assembly according to claim 11, wherein each fastening assembly includes a lock block structured to control movement of the handle between the locked and released positions.

13. A removable cover unit for removable installation in an operative position to a vehicle bed including at least opposing first and second side walls having a first pair of elongated track members mourned thereto and a floor, the first pair of elongated track members each having a cable receiving conduit, the side walls and the floor defining an interior space having an upwardly facing opening, the cover unit comprising:

a second pair of elongated track members each having a cable receiving conduit;

a plurality of transverse support members, each of the plurality of support members having first and second end portions, the first end portions being movably mounted on one of the second pair of track members and the second end portions being movably mounted on the other of the second pair of track members;

a flexible cover mounted to the plurality of transverse support members;

the cover unit being constructed to be removably mounted in an operative position to the vehicle bed with the second pair of track members being aligned with the first pair of track members so that the support members can move along the first and second pairs of track members to extend and retract the flexible cover for opening and closing the vehicle bed, wherein the cable receiving conduits of the second pair of track members are positioned to align with the cable receiving conduits of the first pair of track members when the cover unit is in the operative position;

at least one motor, and a pair of flexible drive cables respectively received in the cable receiving conduits of the second pair of track members, the drive cables being operatively connected to the at least one motor and the plurality of support members to enable the at least one motor, when the cover unit is in the operative position, to drive the drive cables within the aligned cable receiving conduits to move the plurality of transverse support members along the aligned first and second pairs of track members and extend and retract the flexible cover for opening and closing the vehicle bed.

14. A removable cover unit according to claim 13, wherein the support members are movably arranged on the first and second pairs of track members such that (1) movement of a distal one of the support members in an opening direction causes the distal support member to push each of the other support members in a sequential manner in the opening direction and hence sequentially collapse the cover secured thereto, thereby facilitating access to the interior space of the vehicle bed, and (2) movement of the distal support member in a closing direction causes the distal support member to pull the other support members in a sequential manner in the closing direction and hence sequentially moves the cover secured thereto into covering relation to the interior space of the vehicle bed, thereby inhibiting access to the interior space of the vehicle bed;

the distal support member being operatively connected at its first and second end portions to the flexible drive cables to enable the at least one motor to move the distal support member in the opening and closing directions.

15. A removable cover unit according to claim 13, further comprising at least one releasable fastener constructed to secure the cover unit in the operative position and to be released to allow the cover unit to be removed from the vehicle bed.

16. A removable cover unit according to claim 15, wherein the at least one releasable fastener includes a pair of clamps each structured to interlock with respective cover mounts provided on the vehicle bed.

17. A removable cover unit according to claim 16, wherein the cover mounts form a part of the existing vehicle bed.

18. A removable cover unit according to claim 16, wherein each clamp includes a handle portion that can be manually moved between a released position and a locked position, the clamp being interlocked with the respective cover mount in the locked position and being releasable from the respective cover mount in the released position.

19. A removable cover unit according to claim 15, wherein the at least one releasable fastener includes first and second fastening assemblies each having an interlocking slider member structured to be movable into interlocking engagement with a respective one of the first pair of track members provided on the vehicle bed so as to align and interlock the first and second pairs of track members.

20. A removable cover unit according to claim 19, wherein each fastening assembly includes a handle operatively engaged with a respective said slider member to control the movement of the slider member into and out of interlocking engagement with the respective one of the first pair of track members, the handle being movable between (a) locked position to move the slider member into interlocking engagement with the respective one of the first pair of track members and (b) a released position to move the slider member out of interlocking engagement with the respective one of the first pair of track members.

21. A removable cover unit according to claim 20, wherein each fastening assembly includes a lock block structured to control movement of the handle between the locked and released positions.

22. A removable cover unit according to claim 13, wherein the first pair of elongated track members have a length that is greater than a length of the second pair of elongated track members of the cover unit.

23. A removable cover unit according to claim 13, wherein the cover unit includes a pair of locking structures each having a pin structured to engage with a respective cover mount provided on the vehicle bed to facilitate alignment of the cover unit with the vehicle bed.

24. A cover assembly for a vehicle bed having at least opposing first and second side walls and a floor, the side walls and the floor defining an interior space having an upwardly facing opening, the cover assembly comprising:

a first pair of elongated track members mountable to the first and second side walls; and a removable cover unit comprising:
(i) a second pair of elongated track members;
(ii) a plurality of transverse support members, each of the plurality of support members having first and second end portions, the first end portions being movably mounted on one of the second pair of track members and the second end portions being movably mounted on the other of the second pair of track members;
(iii) a flexible cover mounted to the plurality of transverse support members;

the cover unit being constructed to be removably mounted in an operative position to the vehicle bed with the second pair of track members being aligned with the first pair of track members so that the support members can move along the first and second pairs of track members to extend and retract the flexible cover for opening and closing the vehicle bed;

(iv) at least one motor operatively connected to the support members for selectively moving the support members along the first and second pairs of track members to extend and retract the flexible cover; and
(v) at least one releasable fastener movable between a locking position to secure the cover unit in the operative position and an unlocking position to allow the cover unit to be removed from the vehicle bed;

wherein the at least one releasable fastener includes a lock constructed to prevent movement of the at least one releasable fastener from the locking position to the unlocking position, the lock being movable to permit movement of the at least one releasable fastener from the locking position to the unlocking position in response to the flexible cover being retracted such that all the transverse support members are received on the second pair of track members.

25. A removable cover unit for removable installation in an operative position to a vehicle bed including at least opposing first and second side walls having a first pair of elongated track members mounted thereto and a floor, the side walls and the floor defining an interior space having an upwardly facing opening, the cover unit comprising:

a second pair of elongated track members;

a plurality of transverse support members, each of the plurality of support members having first and second end portions, the first end portions being movably mounted on one of the second pair of track members and the second end portions being movably mounted on the other of the second pair of track members;

a flexible cover mounted to the plurality of transverse support members;

the cover unit being constructed to be removably mounted in the operative position to the vehicle bed with the second pair of track members being aligned with the first pair of track members so that the support members can move along the first and second pairs of track members to extend and retract the flexible cover for opening and closing the vehicle bed;

at least one motor operatively connected to the support members for selectively moving the support members along the first and second pairs of track members to extend and retract the flexible cover; and at least one releasable fastener movable between a locking position to secure the cover unit in the operative position and an unlocking position to allow the cover unit to be removed from the vehicle bed;

wherein the at least one releasable fastener includes a lock constructed to prevent movement of the at least one releasable fastener from the locking position to the unlocking position, the lock being movable to permit movement of the at least one releasable fastener from the locking position to the unlocking position in response to the flexible cover being retracted such that all the transverse support members are received on the second pair of track members.

26. A method for mounting a cover assembly to a vehicle bed having at least opposing first and second side walls and a floor, the side walls and the floor defining an interior space having an upwardly facing opening, the method comprising:

mounting a first pair of elongated track members to the first and second side walls;

providing a removable cover unit comprising:
(i) a second pair of elongated track members;
(ii) a plurality of transverse support members, each of the plurality of support members having first and second end portions, the first end portions being movably mounted on one of the second pair of track members and the second end portions being movably mounted on the other of the second pair of track members;
(iii) a flexible cover mounted to the plurality of transverse support members;
(iv) a pair of releasable fasteners each movable between (a) a locking position and (b) an unlocking position, each releasable fastener being provided on a respective one of the second track members.
(v) a pair of interlocking structures movable between an extended position and a retracted position, each interlocking structures being provided on a respective one of the second track members and linked to a respective one of the releasable fasteners such the movement of the releasable fasteners to the unlocking positions moves the interlocking structures to the retracted positions and movement of the releasable fasteners to the locking positions moves the interlocking structures to the extended positions; and
(vi) at least one motor operatively connected to the support members; removably mounting the cover unit in an operative position to the vehicle bed such that the second pair of track members are aligned with the first pair of track members so that the support members can be selectively moved along the first and second pairs of track members by the at least one motor to extend and retract the flexible cover for opening and closing the vehicle bed; and moving the releasable fasteners to the locking positions to secure the cover in the operative position and to move the interlocking structure to the extended positions, wherein in the extended positions the interlocking structures engage the first track members to align and interlock the first and second pairs of track members with one another.

27. A cover assembly for a vehicle bed having at least opposing first and second side walls and a floor, the side walls and the floor defining an interior space having an upwardly facing opening, the cover assembly comprising:

a first pair of elongated track members mountable to the first and second side walls; and a removable cover unit comprising:
(i) a second pair of elongated track members;
(ii) a plurality of transverse support members, each of the plurality of support members having first and second end portions, the first end portions being movably mounted on one of the second pair of track members and the second end portions being movably mounted on the other of the second pair of track members;
(iii) a flexible cover mounted to the plurality of transverse support members;

the cover unit being constructed to be removably mounted in an operative position to the vehicle bed with the second pair of track members being aligned with the first pair of track members so that the support members can move along the first and second pairs of track members to extend and retract the flexible cover for opening and closing the vehicle bed;
(iv) at least one motor operatively connected to the support members for selectively moving the support members along the first and second pairs of track members to extend and retract the flexible cover;
(v) a pair of releasable fasteners each movable between (a) a locking position and (b) an unlocking position, each releasable fastener being provided on a respective one of the second track members; and
(vi) a pair of interlocking structures movable between an extended position and a retracted position, each interlocking structure being provided on a respective one of the second track members and linked to a respective one of the releasable fasteners such that the movement of the releasable fasteners to the unlocking positions moves the interlocking structures to the retracted positions and movement of the releasable fasteners to the locking positions moves the interlocking structures to the extended positions; and wherein in the locking positions the releasable fasteners secure the removable cover unit in the operative position and wherein in the extended positions the interlocking structures engage the first pair of track members to align and interlock the first and second pairs of track members with one another.

28. A removable cover unit for removable installation in an operative position to a vehicle bed including at least opposing first and second side walls having a first pair of elongated track members mounted thereto and a floor, the side walls and the floor defining an interior space having an upwardly facing opening, the cover unit comprising:

a second pair of elongated track members;

a plurality of transverse support members, each of the plurality of support members having first and second end portions, the first end portions being movably mounted on one of the second pair of track members and the second end portions being movably mounted the other of the second pair of track members;

a flexible cover mounted to the plurality of transverse support members;

the cover unit being constructed to be removably mounted in the operative position to the vehicle bed with the second pair of track members being aligned with the first pair of track members so that the support members can move along the first and second pairs of track members to extend and retract the flexible cover for opening and closing the vehicle bed;

at least one motor operatively connected to the support members for selectively moving the support members along the first and second pairs of track members to extend and retract the flexible cover;

a pair of releasable fasteners each movable between (a) a locking position and (b) an unlocking position, each releasable fastener being provided on a respective one of the second track members; and a pair of interlocking structures movable between an extended position and a retracted position, each interlocking structure being provided on a respective one of the second track members and linked to a respective one of the releasable fasteners such that the movement of the releasable fasteners to the unlocking positions moves the interlocking structures to the retracted positions and movement of the releasable fasteners to the locking positions moves the interlocking structures to the extended positions; and wherein in the locking positions the releasable fasteners secure the removable cover unit in the operative position and wherein in the extended positions the interlocking structures engage the first pair of track members to align and interlock the first and second pairs of track members with one another.

29. A cover assembly for a vehicle bed having at least opposing first and second side walls and a floor, the side walls and the floor defining an interior space having an upwardly facing opening, the cover assembly comprising:

a first pair of elongated track members mountable to the first and second side walls; and a removable cover unit comprising:
(i) a second pair of elongated track members;
(ii) a plurality of transverse support members, each of the plurality of support members having first and second end portions, the first end portions being movably mounted on one of the second pair of track members and the second end portions being movably mounted on the other of the second pair of track members;
(iii) a flexible cover mounted to the plurality of transverse support members;

the cover unit being constructed to be removably mounted in an operative position to the vehicle bed with the second pair of track members being aligned with the first pair of track members so that the support members can move along the first and second pairs of track members to extend and retract the flexible cover for opening and closing the vehicle bed;
(iv) at least one motor operatively connected to the support members for selectively moving the support members along the first and second pairs of track members to extend and retract the flexible cover; and
(v) at least one releasable fastener constructed to secure the cover unit in the operative position and to be releasable to allow the cover unit to be removed from the vehicle bed;

wherein the at least one releasable fastener includes first and second fastening assemblies each having an interlocking slider member structured to be movable into interlocking engagement with a respective one of the first pair of track members provided on the vehicle bed so as to align and interlock the first and second pairs of track members;

wherein each fastening assembly includes a handle operatively engaged with a respective said slider member to control the movement of the slider member into and out of interlocking engagement with the respective one of the first pair of track members, the handle being movable between (a) a locked position to move the slider member into interlocking engagement with the respective one of the first pair of track members and (b) a released position to move the slider member out of interlocking engagement with the respective one of the first pair of track members.

30. A cover assembly according to claim 29, wherein each fastening assembly includes a lock block structured to control movement of the handle between the locked and released positions.

31. A cover assembly for a vehicle bed having at least opposing first and second side walls and a floor, the side walls and the floor defining an interior space having an upwardly facing opening, the cover assembly comprising:

a first pair of elongated track members mountable to the first and second side walls; and a removable cover unit comprising:
(i) a second pair of elongated track members;
(ii) a plurality of transverse support members, each of the plurality of support members having first and second end portions, the first end portions being movably mounted on one of the second pair of track members and the second end portions being movably in mounted on the other of the second pair of track members;
(iii) a flexible cover mounted to the plurality of transverse support members;

the cover unit being constructed to be removably mounted in an operative position to the vehicle bed with the second pair of track members being aligned with the first pair of track members so that the support members can move along the first and second pairs of track members to extend and retract the flexible cover for opening and closing the vehicle bed;
(iv) at least one motor operatively connected to the support members for selectively moving the support members along the first and second pairs of track members to extend and retract the flexible cover; and
(v) at least one releasable fastener constructed to secure the cover unit in the operative position and to be releasable to allow the cover unit to be removed from the vehicle bed;

wherein the cover unit includes a pair of locking structures each having a pin structured to engage with a respective cover mount provided on the vehicle bed to facilitate alignment of the cover unit with the vehicle bed.

32. A removable cover unit for removable installation in an operative position to a vehicle bed including at least opposing first and second side walls having a first pair of elongated track members mounted thereto and a floor, the side walls and the floor defining an interior space having an upwardly facing opening, the cover unit comprising:

a second pair of elongated track members;

a plurality of transverse support members, each of the plurality of support members having first and second end portions, the first end portions being movably mounted on one of the second pair of track members and the second end portions being movably mounted on the other of the second pair of track members;

a flexible cover mounted to the plurality of transverse support members;

the cover unit being constructed to be removably mounted in the operative position to the vehicle bed with the second pair of track members being aligned with the first pair of track members so that the support members can move along the first and second pairs of track members to extend and retract the flexible cover for opening and closing the vehicle bed;

at least one motor operatively connected to the support members for selectively moving the support members along the first and second pairs of track members to extend and retract the flexible cover; and at least one releasable fastener being constructed to secure the cover unit in the operative position and to be releasable to allow the cover unit to be removed from the vehicle bed;

wherein the at least one releasable fastener includes first and second fastening assemblies each having an interlocking slider member structured to be movable into interlocking engagement with a respective one of the first pair of track members provided on the vehicle bed so as to align and interlock the first and second pairs of track members.

wherein each fastening assembly includes a handle operatively engaged with a respective said slider member to control the movement of the slider member into and out of interlocking engagement with the respective one of the first pair of track members, the handle being movable between (a) a locked position to move the slider member into interlocking engagement with the respective one of the first pair of track members and (b) a released position to move the slider member out of interlocking engagement with the respective one of the first pair of track members.

33. A removable cover unit according to claim 32, wherein each fastening assembly includes a lock block structured to control movement of the handle between the locked and released positions.

34. A removable cover unit for removable installation in an operative position to a vehicle bed including at least opposing first and second side walls having a first pair of elongated track members mounted thereto and a floor, the side walls and the floor defining an interior space having an upwardly facing opening, the cover unit comprising:

a second pair of elongated track members;

a plurality of transverse support members, each of the plurality of support members having first and second end portions, the first end portions being movably mounted on one of the second pair of track members and the second end portions being movably mounted on the other of the second pair of track members;

a flexible cover mounted to the plurality of transverse support members;

the cover unit being constructed to be removably mounted in the operative position to the vehicle bed with the second pair of track members being aligned with the first pair of track members so that the support members can move along the first and second pairs of track members to extend and retract the flexible cover for opening and closing the vehicle bed;

at least one motor operatively connected to the support members for selectively moving the support members along the first and second pairs of track members to extend and retract the flexible cover; and at least one releasable fastener being constructed to secure the cover unit in the operative position and to be releasable to allow the cover unit to be removed from the vehicle bed;

wherein the cover unit includes a pair of locking structures each having a pin structured to engage with a respective cover mount provided on the vehicle bed to facilitate alignment of the cover unit with the vehicle bed.

* * * * *

UNITED STATES PATENT AND TRADEMARK OFFICE
CERTIFICATE OF CORRECTION

PATENT NO.        : 6,948,760 B2                                      Page 1 of 1
APPLICATION NO.   : 10/445866
DATED             : September 27, 2005
INVENTOR(S)       : Craig T. Marx et al.

It is certified that error appears in the above-identified patent and that said Letters Patent is hereby corrected as shown below:

IN THE CLAIMS

Col.12, line 37, change "fist" to --first--

Col. 17, line 40, after "members;" and before "removably" insert a paragraph

Signed and Sealed this

Twenty-ninth Day of August, 2006

JON W. DUDAS
*Director of the United States Patent and Trademark Office*